United States Patent
Sugioka

(10) Patent No.: US 10,516,556 B2
(45) Date of Patent: Dec. 24, 2019

(54) TRANSMISSION DEVICE, RECEPTION DEVICE, AND COMMUNICATION SYSTEM

(71) Applicant: Sony Corporation, Tokyo (JP)

(72) Inventor: Tatsuya Sugioka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/746,542

(22) PCT Filed: Jul. 22, 2016

(86) PCT No.: PCT/JP2016/003433
§ 371 (c)(1),
(2) Date: Jan. 22, 2018

(87) PCT Pub. No.: WO2017/026096
PCT Pub. Date: Feb. 16, 2017

(65) Prior Publication Data
US 2018/0212804 A1    Jul. 26, 2018

(30) Foreign Application Priority Data

Aug. 10, 2015 (JP) .................. 2015-158110

(51) Int. Cl.
*H04L 25/49* (2006.01)
*H04L 25/02* (2006.01)
*H04L 25/14* (2006.01)

(52) U.S. Cl.
CPC .......... *H04L 25/49* (2013.01); *H04L 25/0272* (2013.01); *H04L 25/0278* (2013.01); *H04L 25/14* (2013.01); *H04L 25/4923* (2013.01)

(58) Field of Classification Search
CPC . H04L 25/49; H04L 25/0272; H04L 25/0278; H04L 25/14; H04L 25/4923
See application file for complete search history.

(56) References Cited

U.S. PATENT DOCUMENTS

| | | | |
|---|---|---|---|
| 8,064,535 B2 | 11/2011 | Wiley | |
| 9,094,000 B1 | 7/2015 | Bar-Lev et al. | |
| 2009/0225873 A1* | 9/2009 | Lee | H04L 25/0272 375/257 |
| 2011/0163791 A1* | 7/2011 | Kanda | H03K 19/01721 327/315 |
| 2014/0254712 A1 | 9/2014 | Lee et al. | |

(Continued)

FOREIGN PATENT DOCUMENTS

| | | |
|---|---|---|
| JP | 06-261092 A | 9/1994 |
| JP | 2007-306065 A | 11/2007 |

(Continued)

OTHER PUBLICATIONS

Japanese Office Action issued Jun. 11, 2019 for corresponding Japanese Application No. 2015-58110.

*Primary Examiner* — Jaison Joseph
(74) *Attorney, Agent, or Firm* — Michael Best & Friedrich LLP

(57) ABSTRACT

Provided is a transmission device including a transmitter. The transmitter includes a first output, a second output, and a third output, and is configured to transmit a symbol signal corresponding to a combination of signals of the first output, the second output, and the third output. An output impedance of the second output is lower than an output impedance of the first output.

16 Claims, 30 Drawing Sheets

(56) References Cited

U.S. PATENT DOCUMENTS

2015/0043693 A1\* 2/2015 Lee .................. G06F 13/36
375/354
2016/0204964 A1\* 7/2016 Takahashi ............ H04L 25/028
375/230

FOREIGN PATENT DOCUMENTS

| JP | 2009-077099 A | 4/2009 |
| JP | 2009-200554 A | 9/2009 |
| JP | 2009-284427 A | 12/2009 |
| JP | 2011-517159 A | 5/2011 |
| JP | 2011-155598 | 8/2011 |

\* cited by examiner

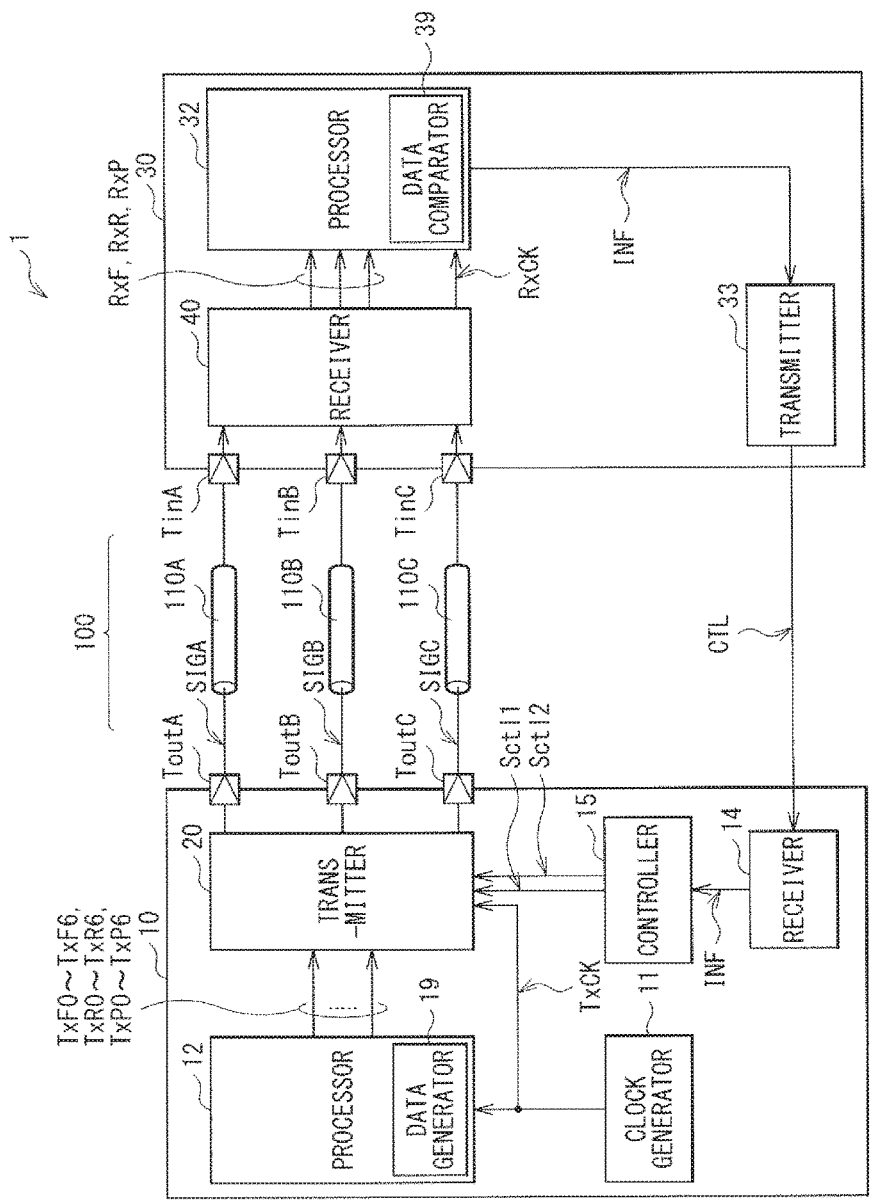
[Fig. 1]

[Fig. 2]
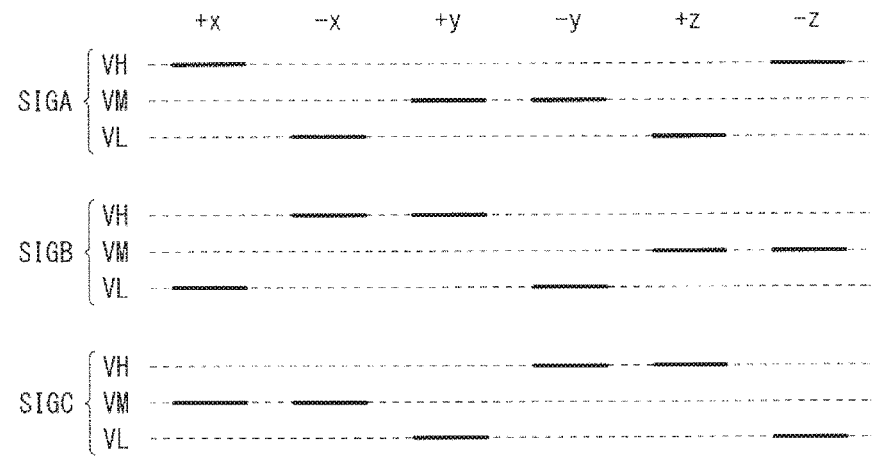
[Fig. 3]
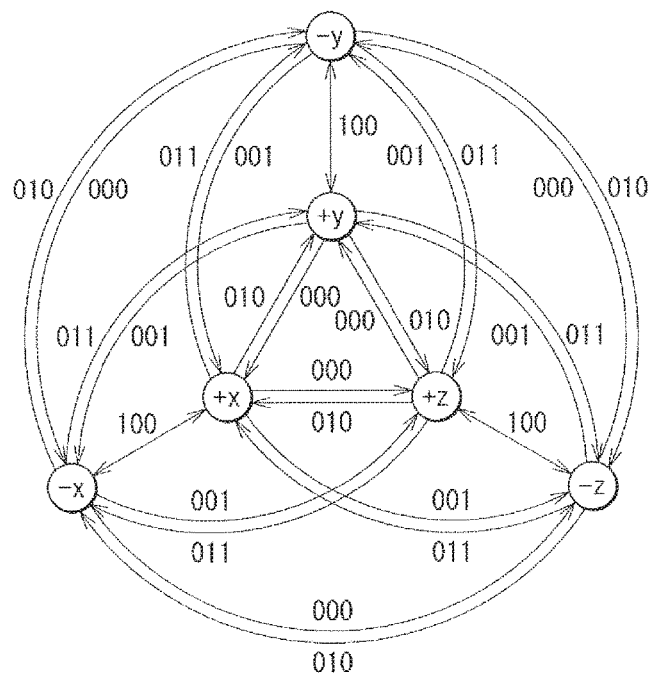

[Fig. 4]
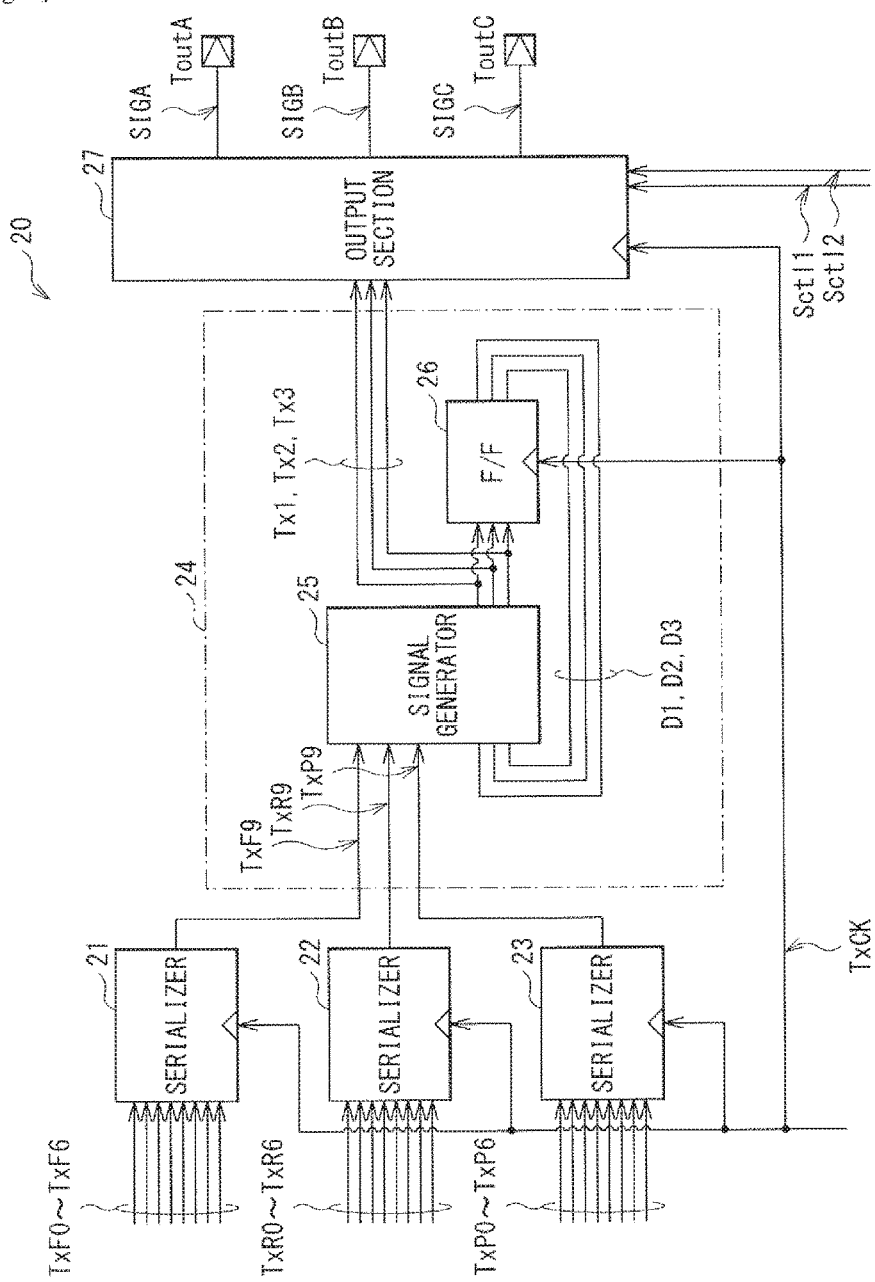

[Fig. 5]

| SYMBOL | SYMBOL SIGNAL Tx1 | SYMBOL SIGNAL Tx2 | SYMBOL SIGNAL Tx3 | SIGNAL SIGA | SIGNAL SIGB | SIGNAL SIGC |
|---|---|---|---|---|---|---|
| +x | 1 | 0 | 0 | VH | VL | VM |
| −x | 0 | 1 | 1 | VL | VH | VM |
| +y | 0 | 1 | 0 | VM | VH | VL |
| −y | 1 | 0 | 1 | VM | VL | VH |
| +z | 0 | 0 | 1 | VL | VM | VH |
| −z | 1 | 1 | 0 | VH | VM | VL |

[Fig. 6]
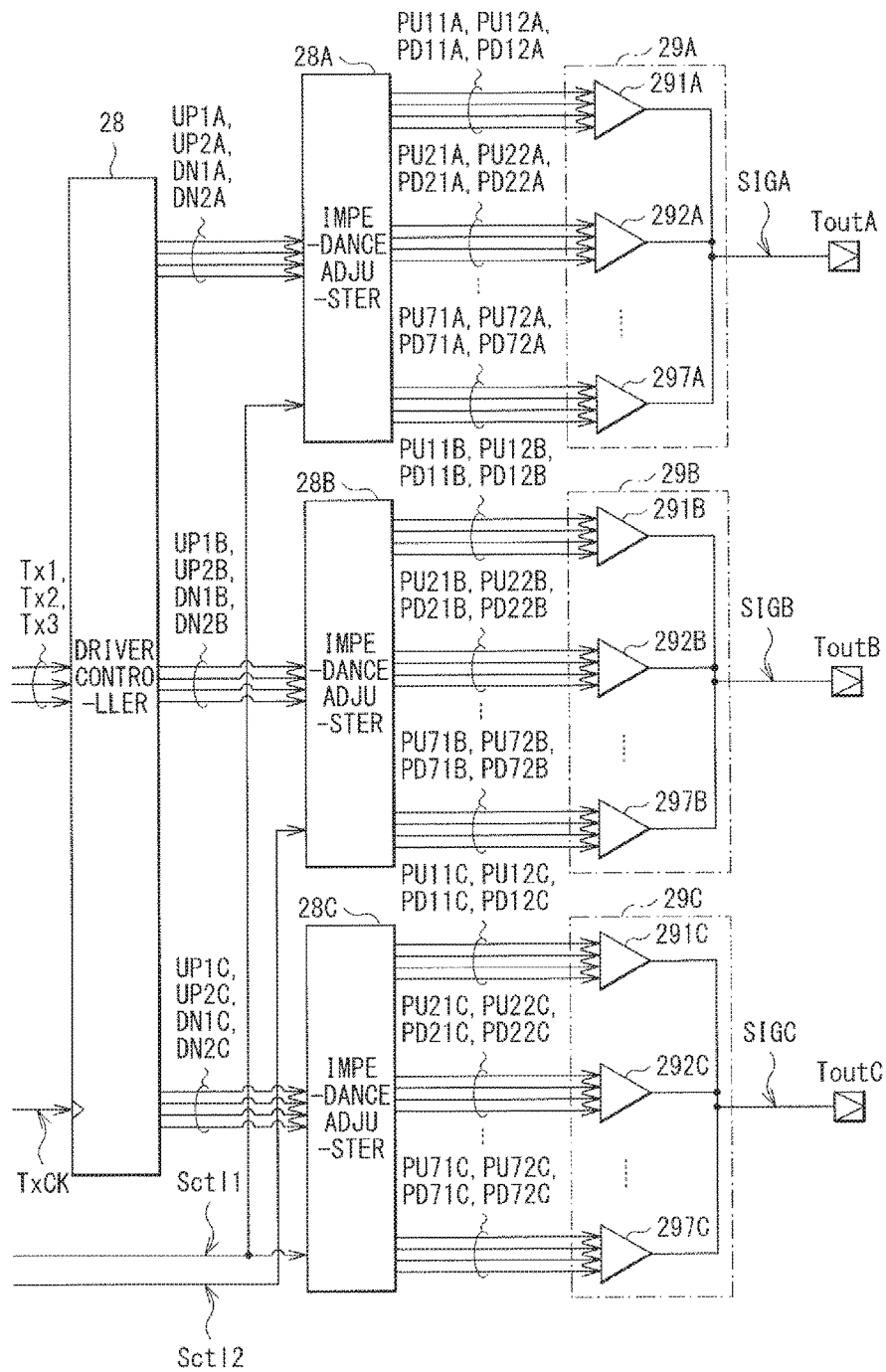

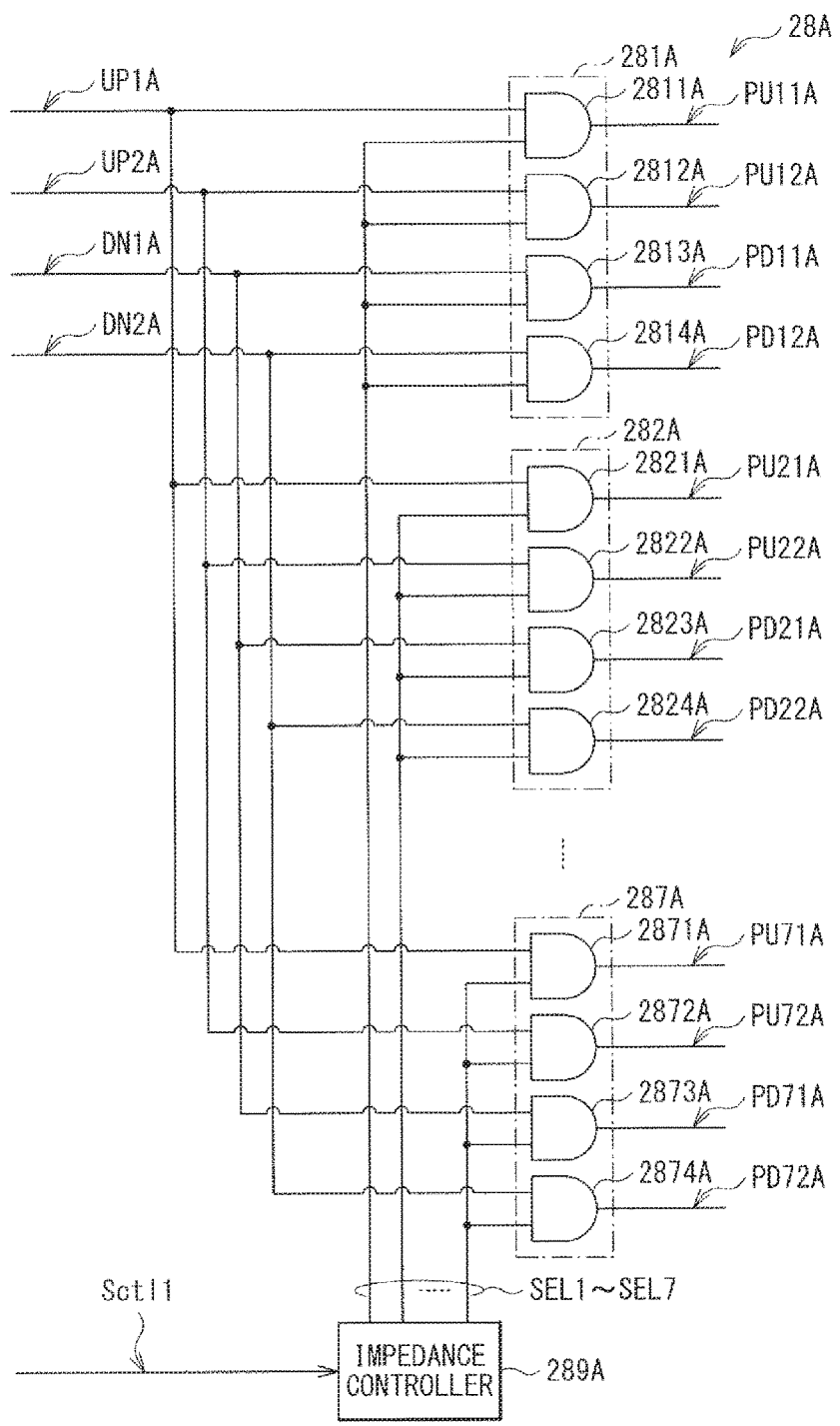
[Fig. 7]

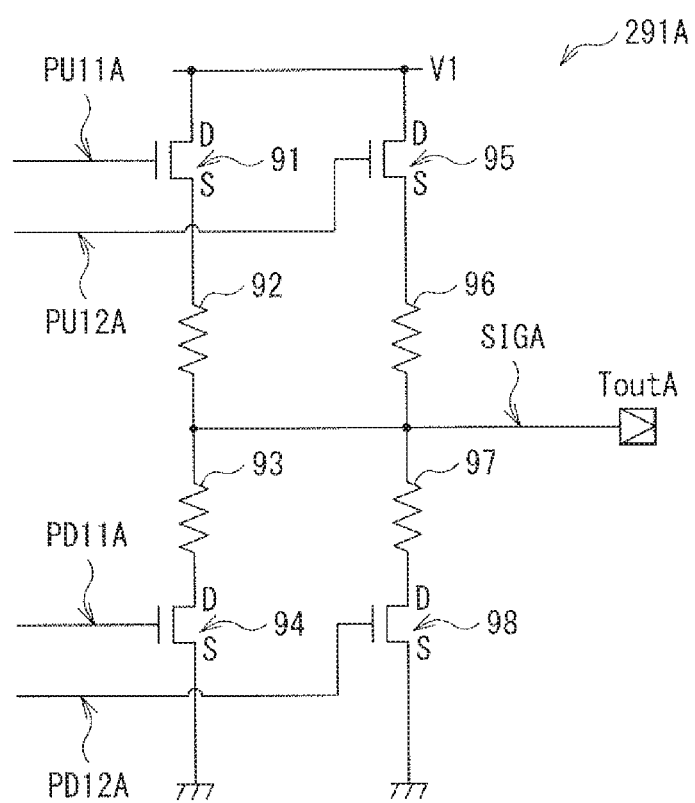
[Fig. 8]

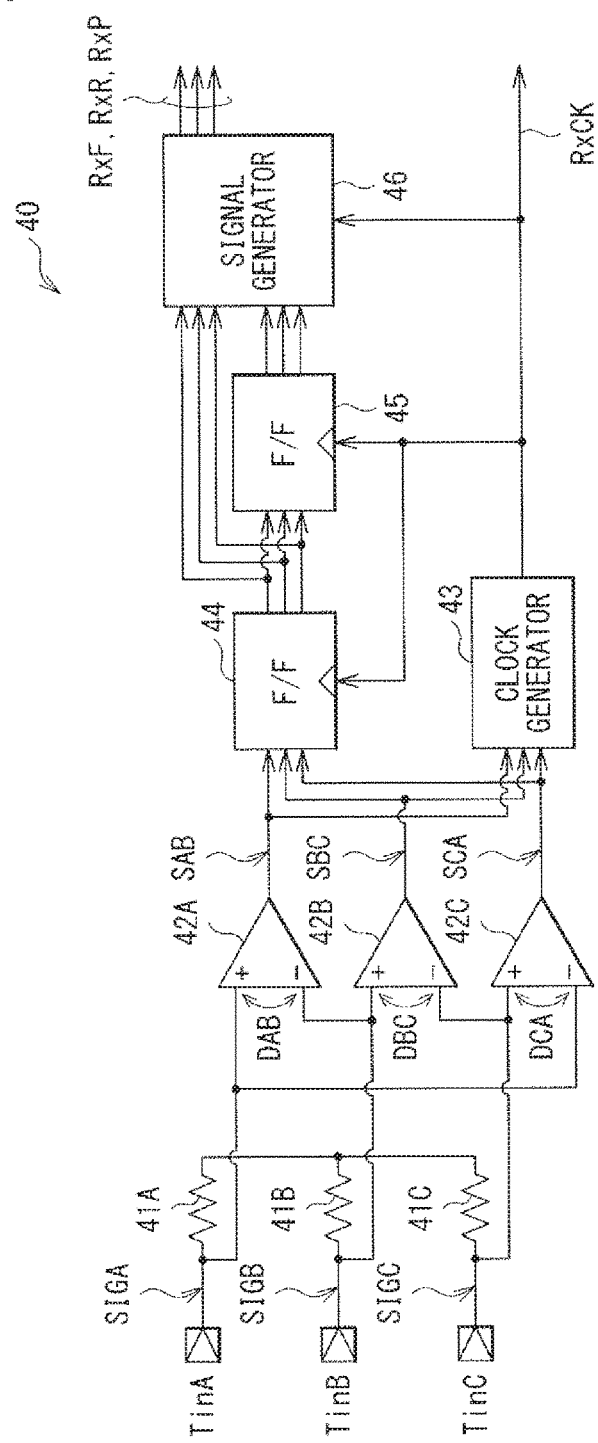
[Fig. 9]

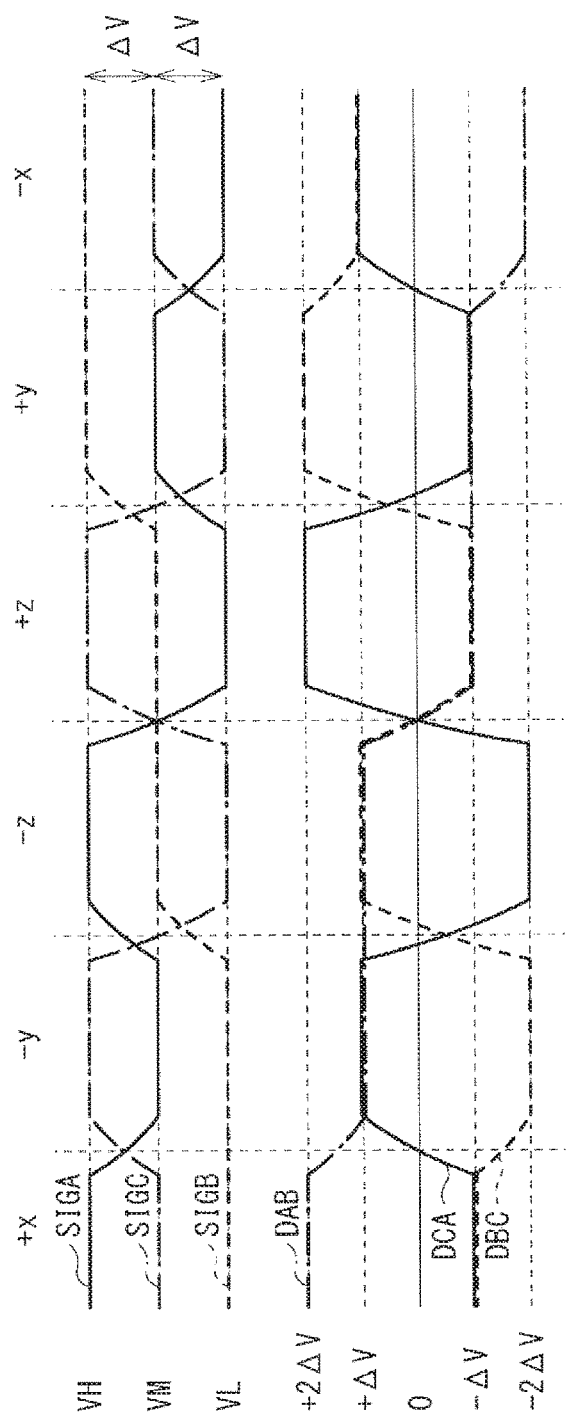
[Fig. 10]

[Fig. 11]
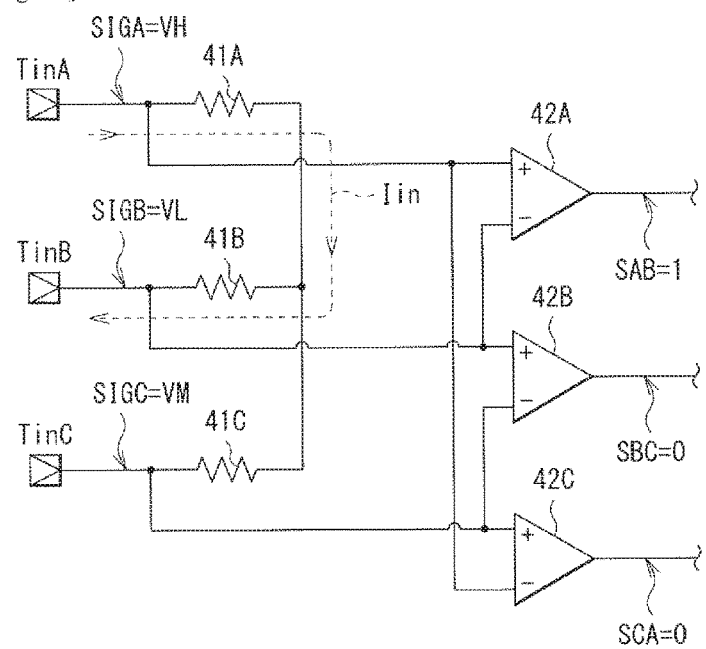
[Fig. 12]
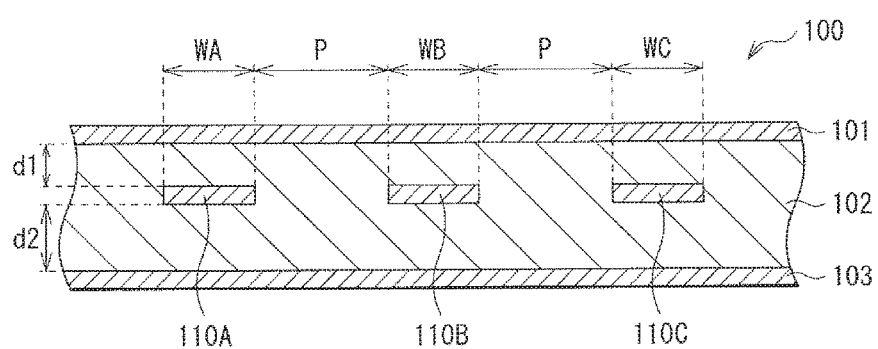

[Fig. 13]
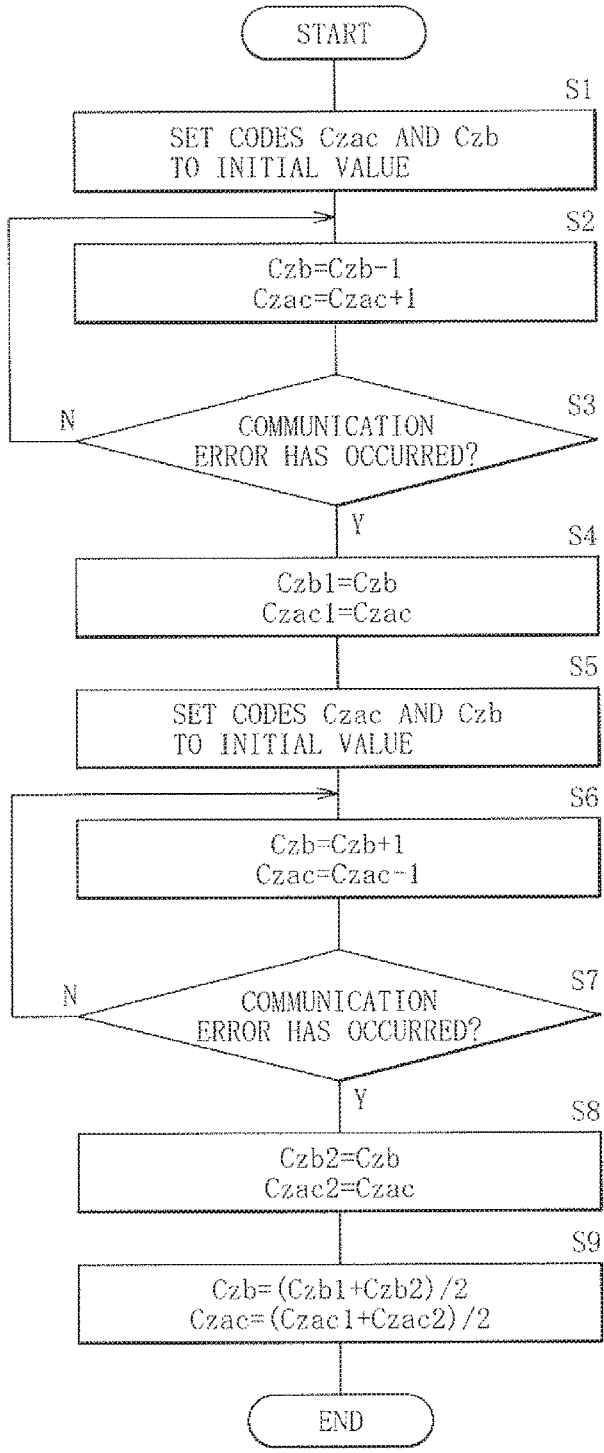

[Fig. 14]

|  | CASE C1 $\begin{pmatrix} Zoa=60\Omega \\ Zob=60\Omega \\ Zoc=60\Omega \end{pmatrix}$ | CASE C2 $\begin{pmatrix} Zoa=54\Omega \\ Zob=60\Omega \\ Zoc=60\Omega \end{pmatrix}$ | CASE C3 $\begin{pmatrix} Zoa=60\Omega \\ Zob=54\Omega \\ Zoc=60\Omega \end{pmatrix}$ | CASE C4 $\begin{pmatrix} Zoa=60\Omega \\ Zob=60\Omega \\ Zoc=54\Omega \end{pmatrix}$ |
|---|---|---|---|---|
| DP1 | 37.9mV | 37.9mV | 41.6mV | 37.7mV |
| DP2 | 40.6mV | 40.5mV | 42.1mV | 40.5mV |
| DP3 | 42.1mV | 41.3mV | 42.2mV | 42.1mV |
| DP4 | 42.6mV | 42.4mV | 42.3mV | 42.6mV |
| DP5 | 42.6mV | 42.7mV | 42.4mV | 42.6mV |
| DP6 | 42.7mV | 42.9mV | 42.7mV | 42.8mV |
| DP7 | 42.9mV | 43.1mV | 42.8mV | 42.9mV |
| DP8 | 43.2mV | 43.2mV | 43.2mV | 43.2mV |
| DP9 | 43.2mV | 43.5mV | 43.5mV | 43.4mV |
| DP10 | 43.4mV | 44.0mV | 43.6mV | 43.4mV |

[Fig. 15]
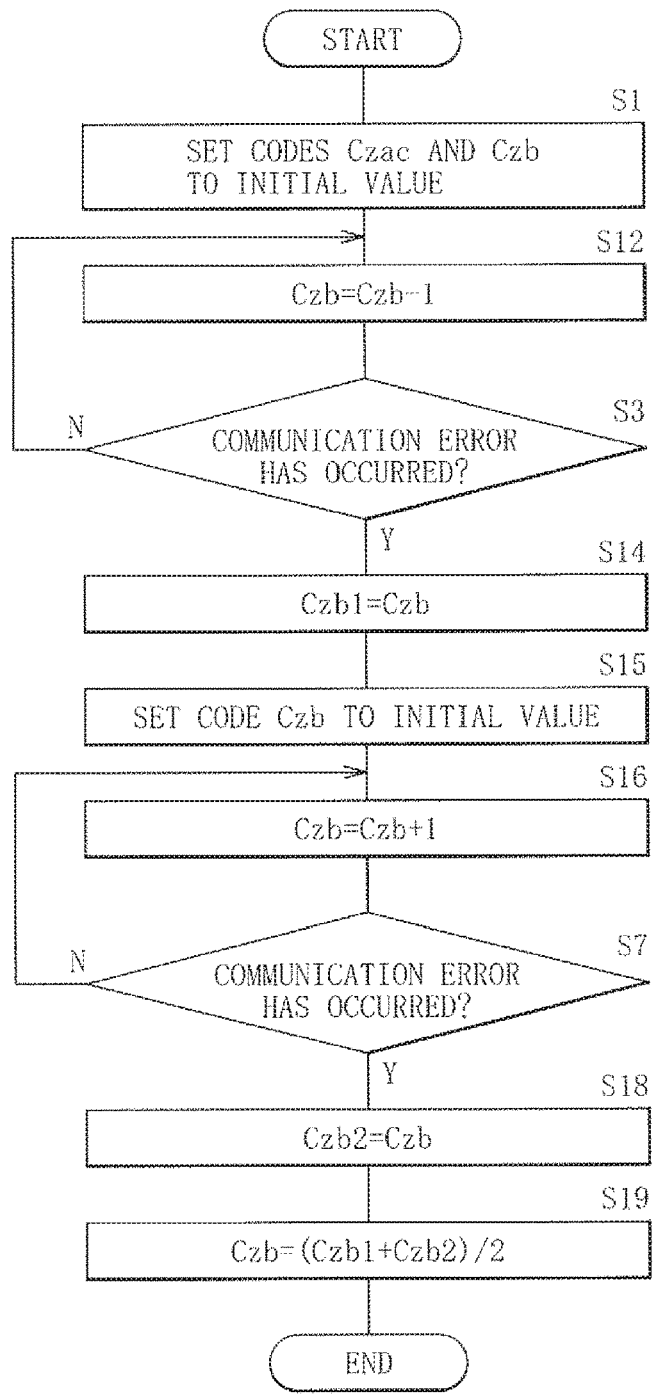

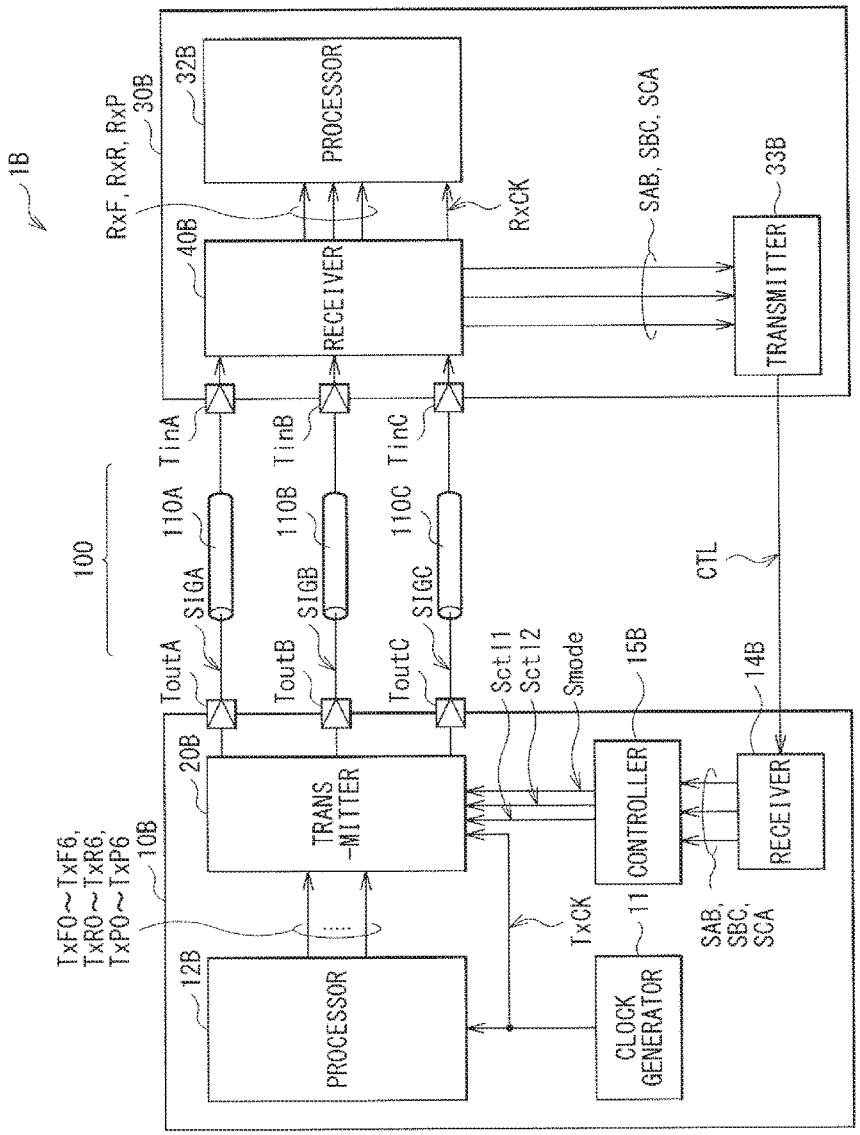
[Fig. 16]

[Fig. 17]
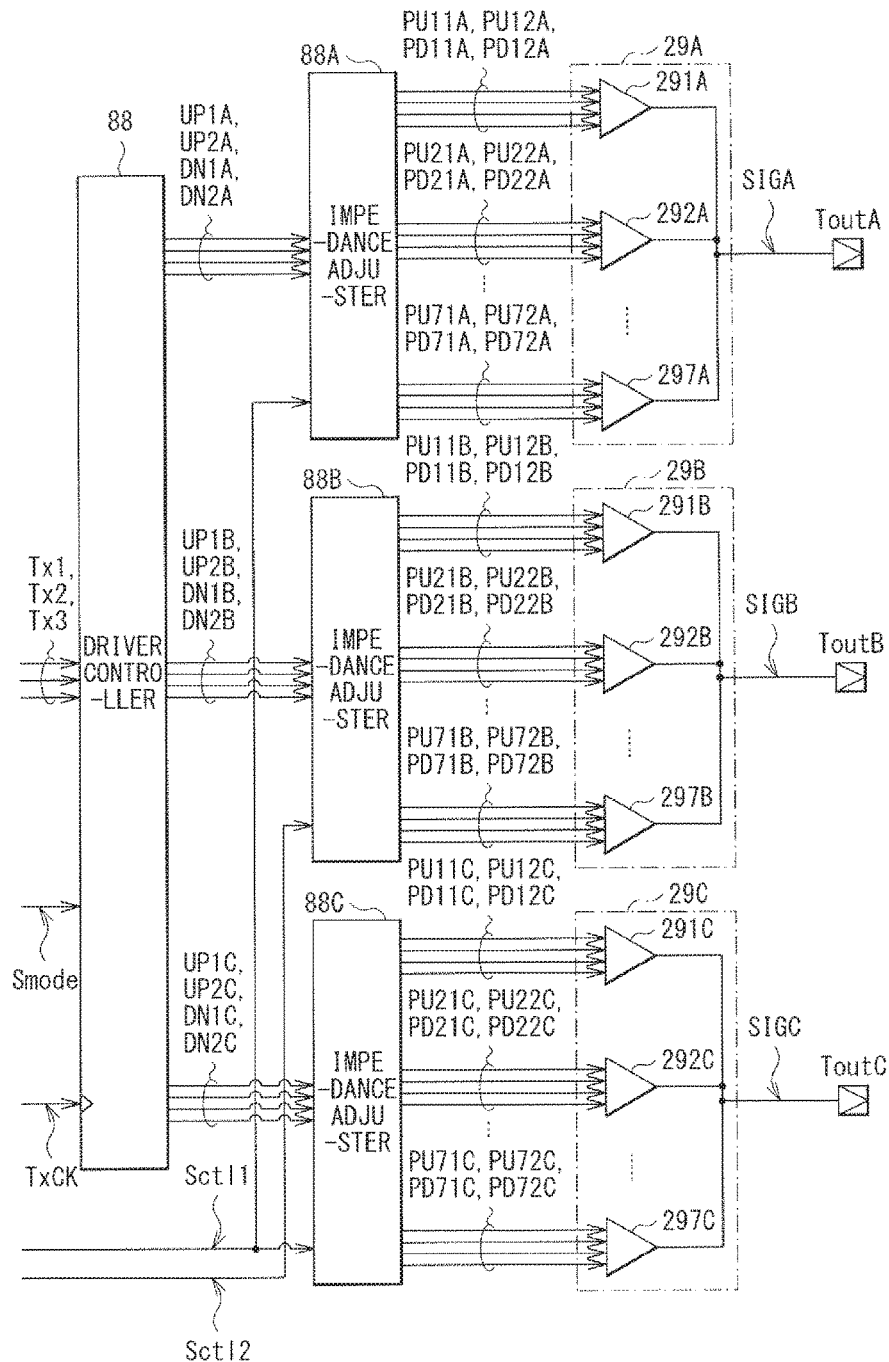

[Fig. 18]

| CONTROL SIGNAL Smode | SIGNAL SIGA | SIGNAL SIGB | SIGNAL SIGC | EXPECTED VALUE |
|---|---|---|---|---|
| MODE M1 | VH | VH | VL | SAB=0 |
| MODE M2 | VL | VH | VH | SBC=1 |
| MODE M3 | VL | VL | VH | SAB=1 |
| MODE M4 | VH | VL | VL | SBC=0 |

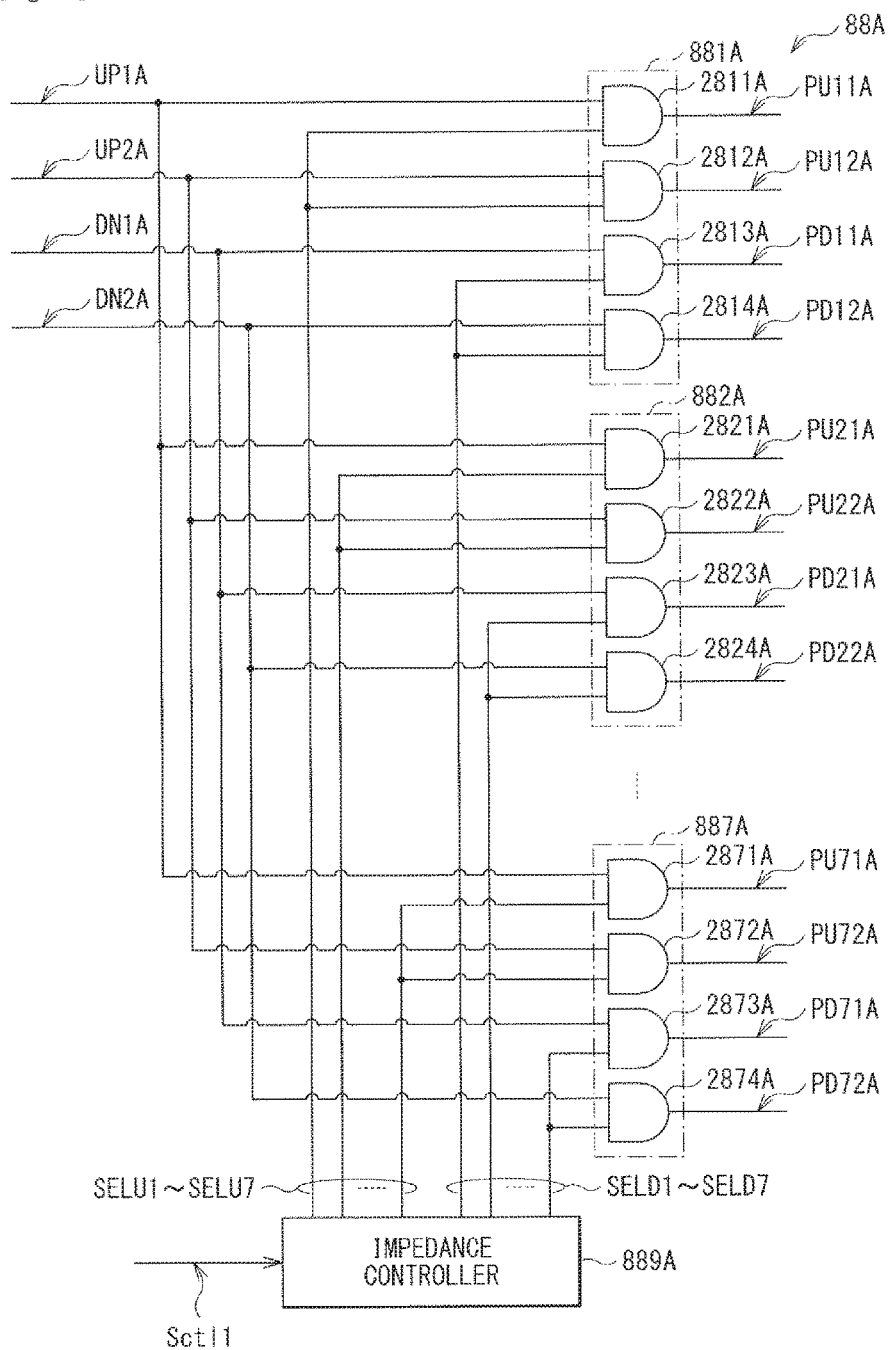

[Fig. 20]
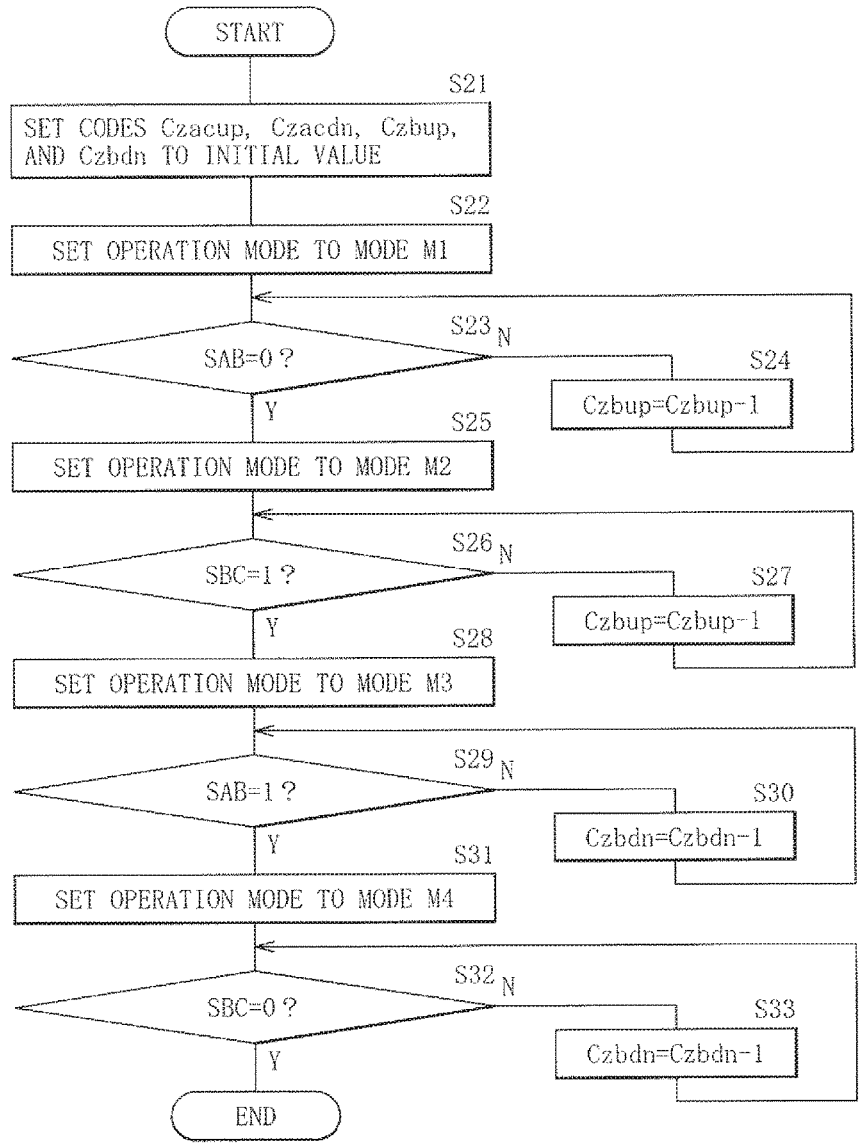

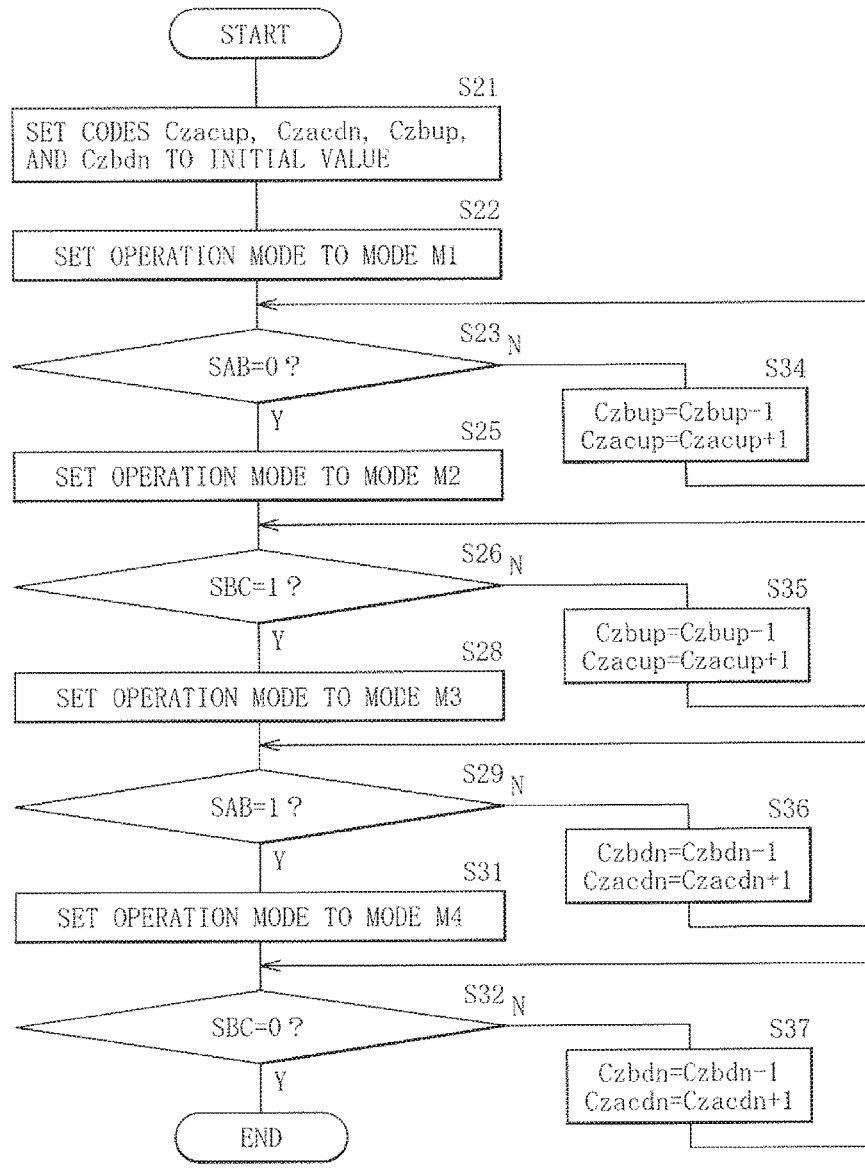
[Fig. 21]

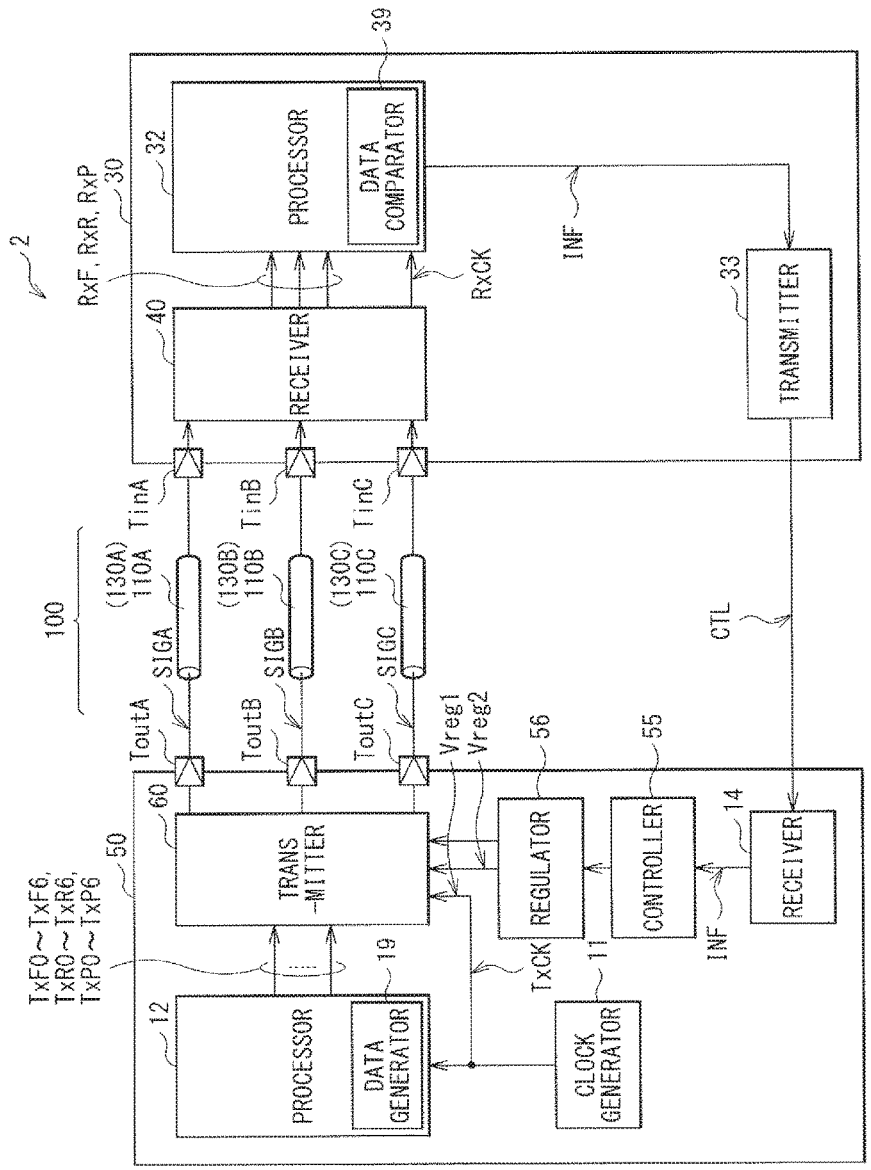
[Fig. 22]

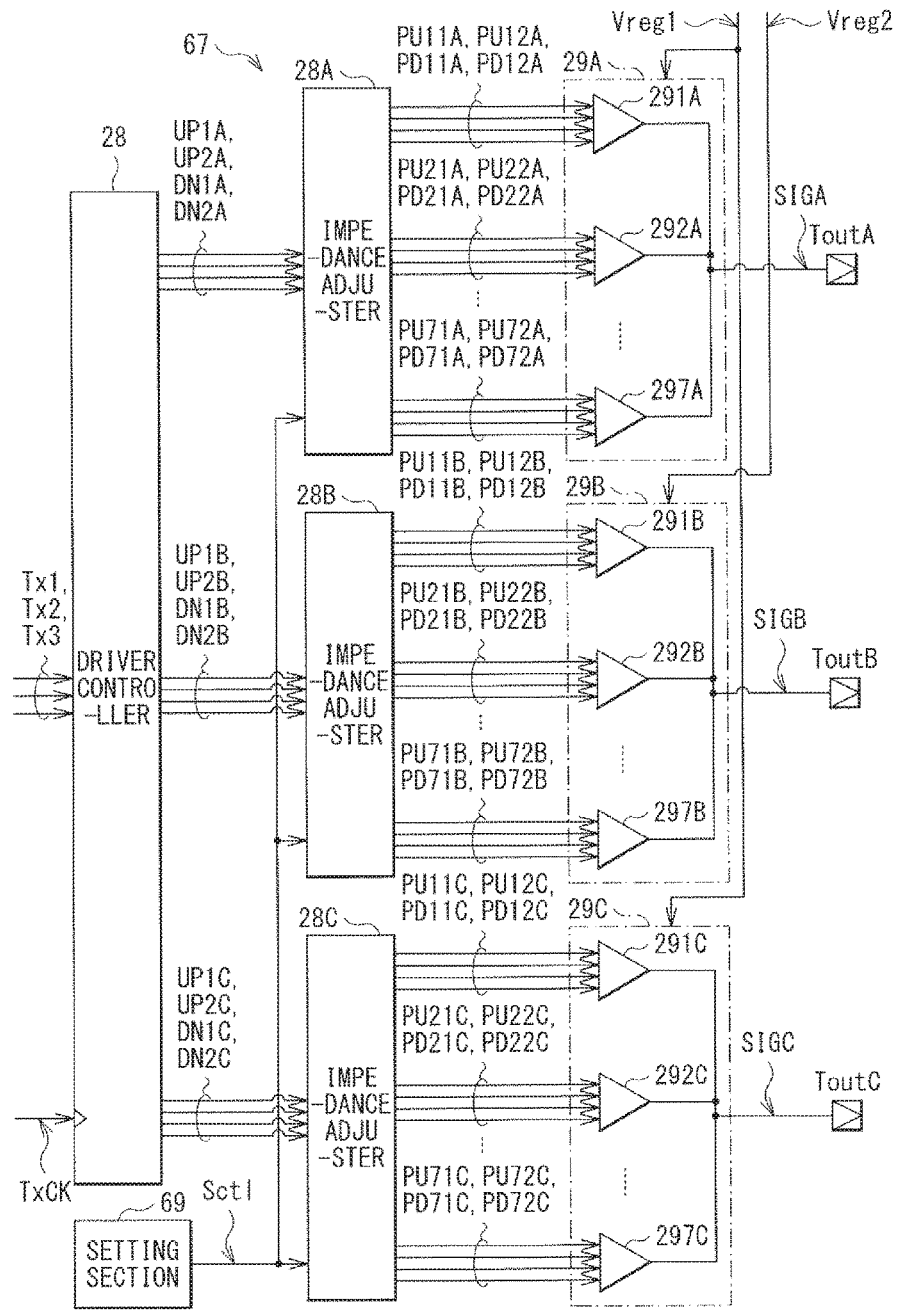
[Fig. 23]

[Fig. 24]
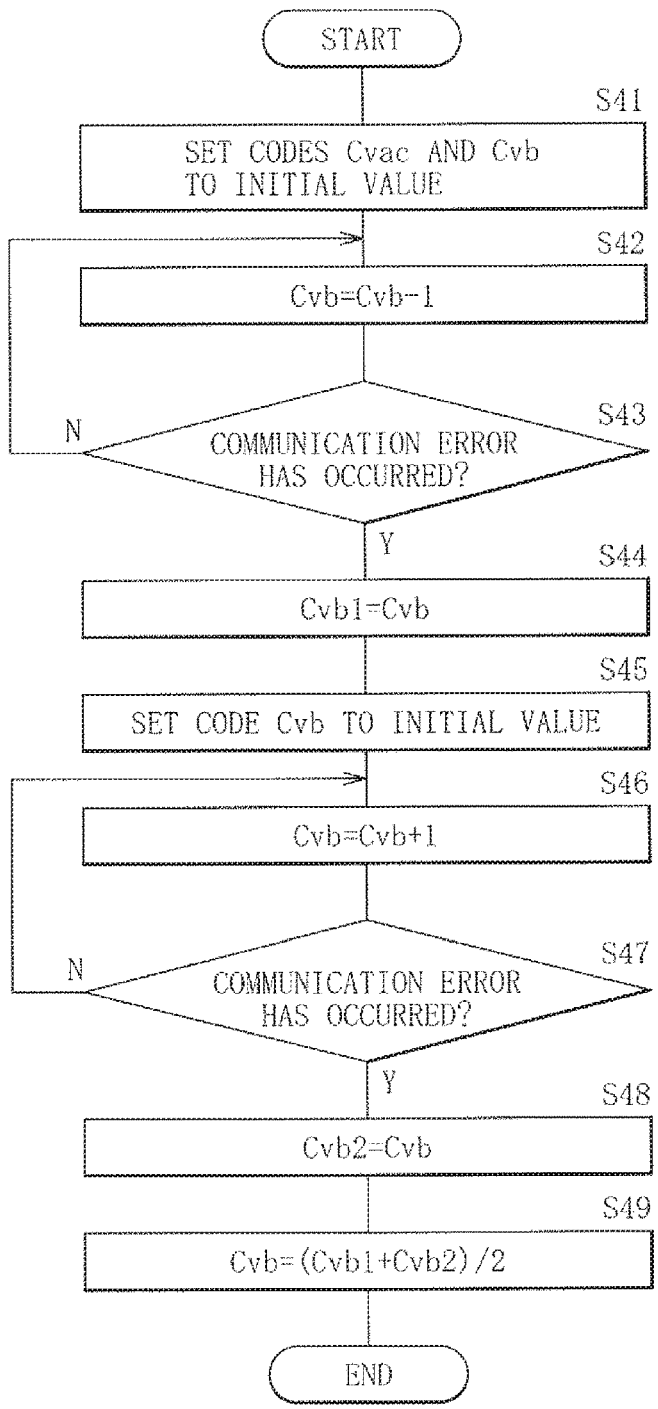

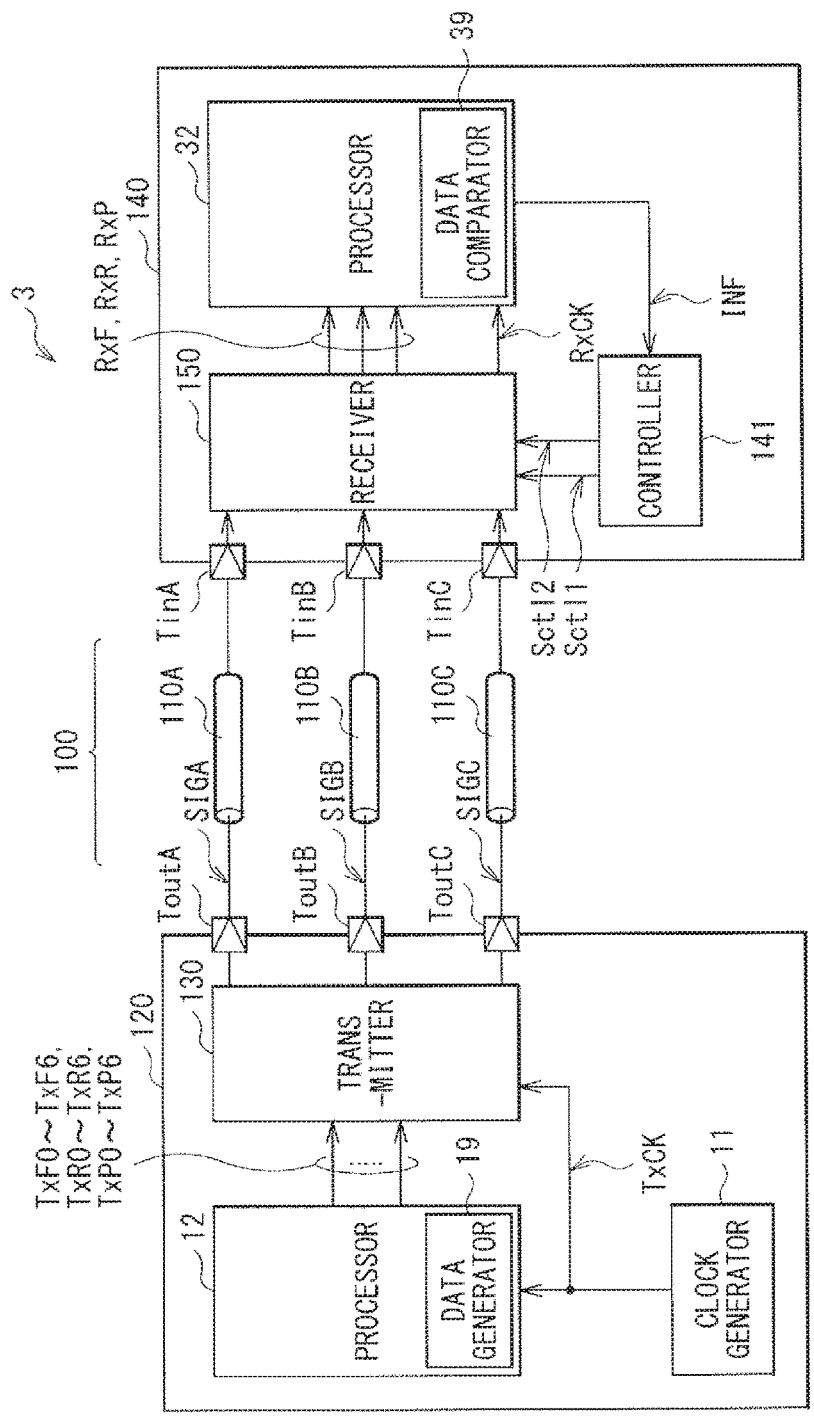
[Fig. 25]

[Fig. 26]
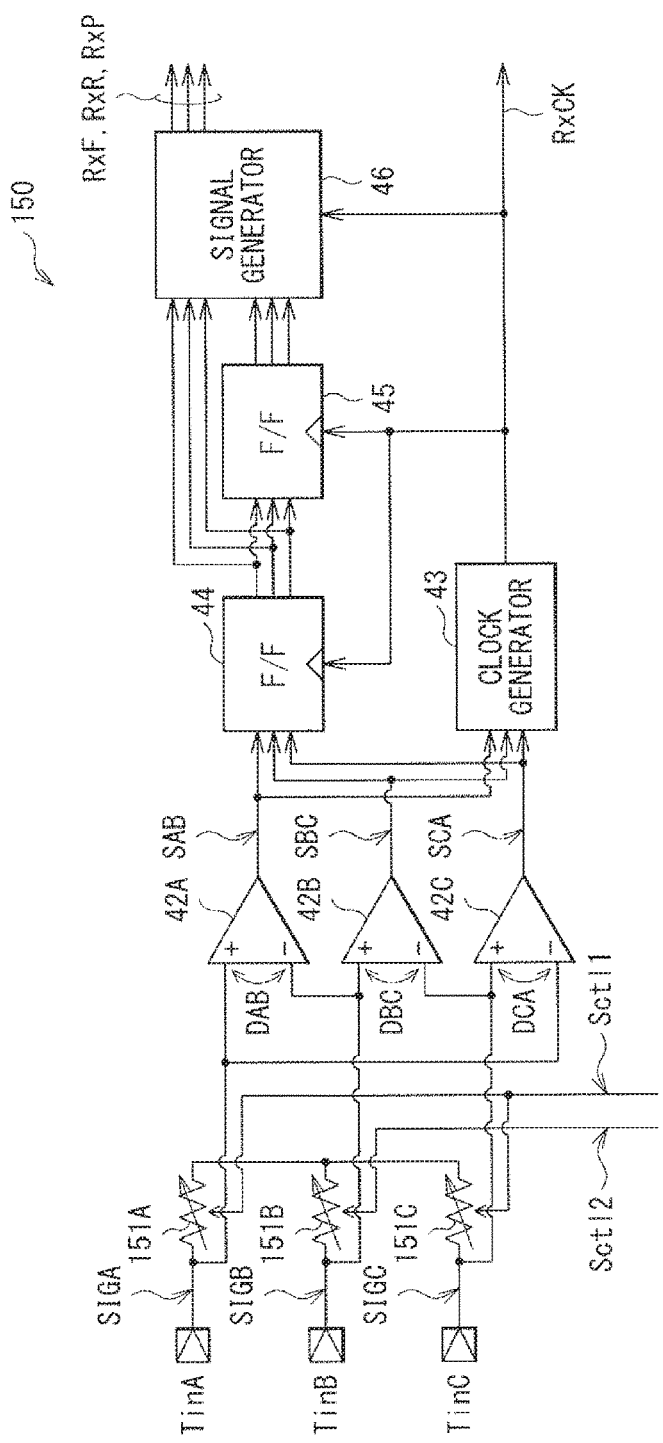

[Fig. 27]
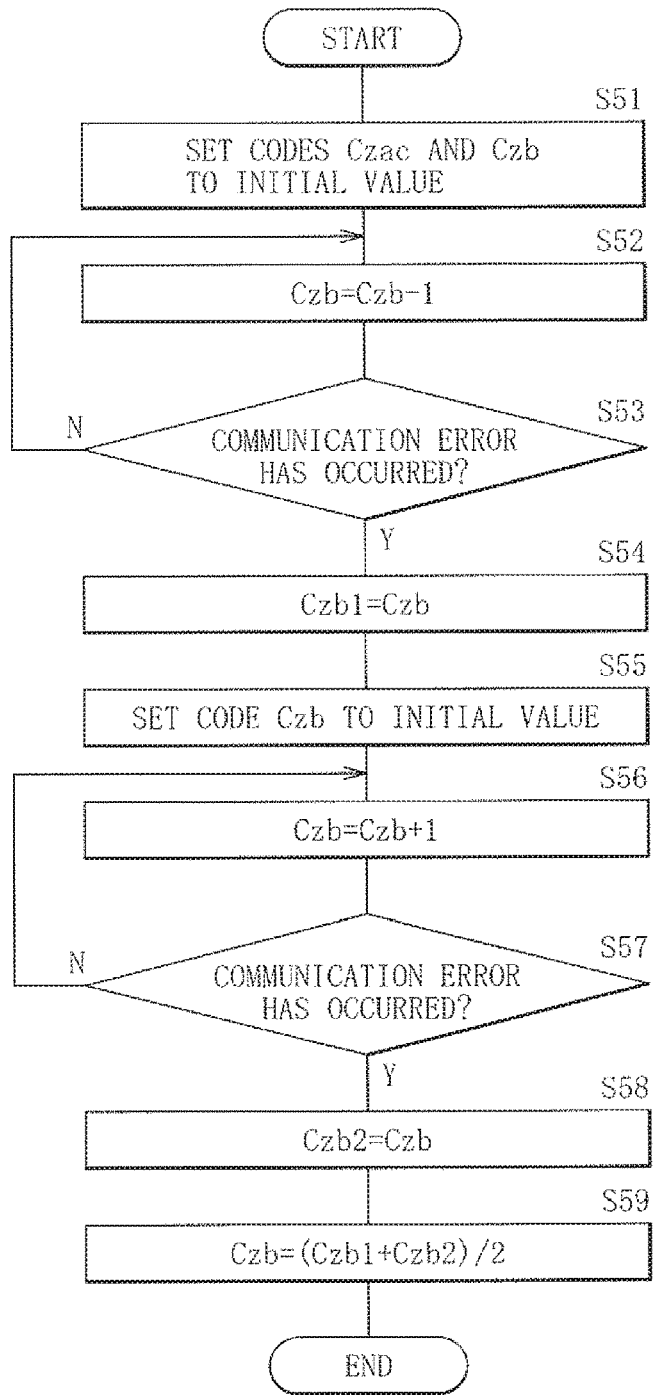

[Fig. 28]
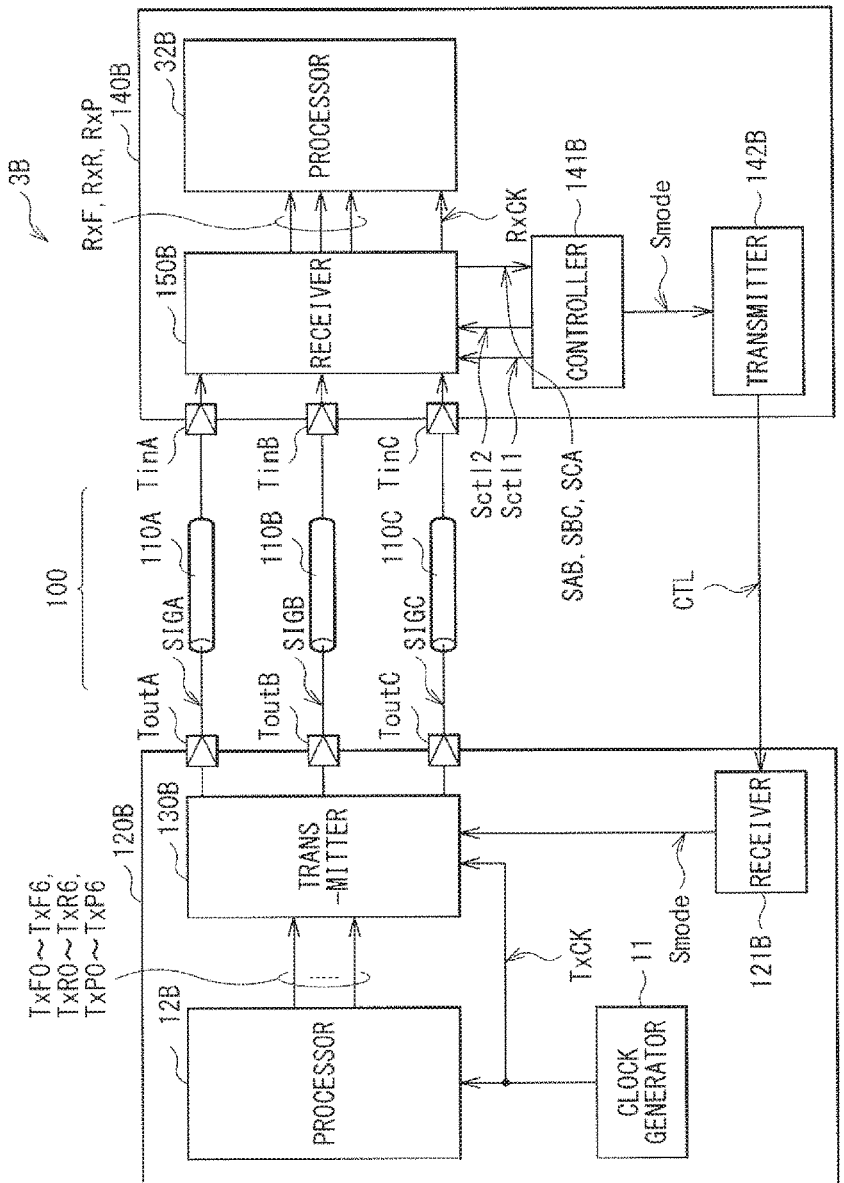

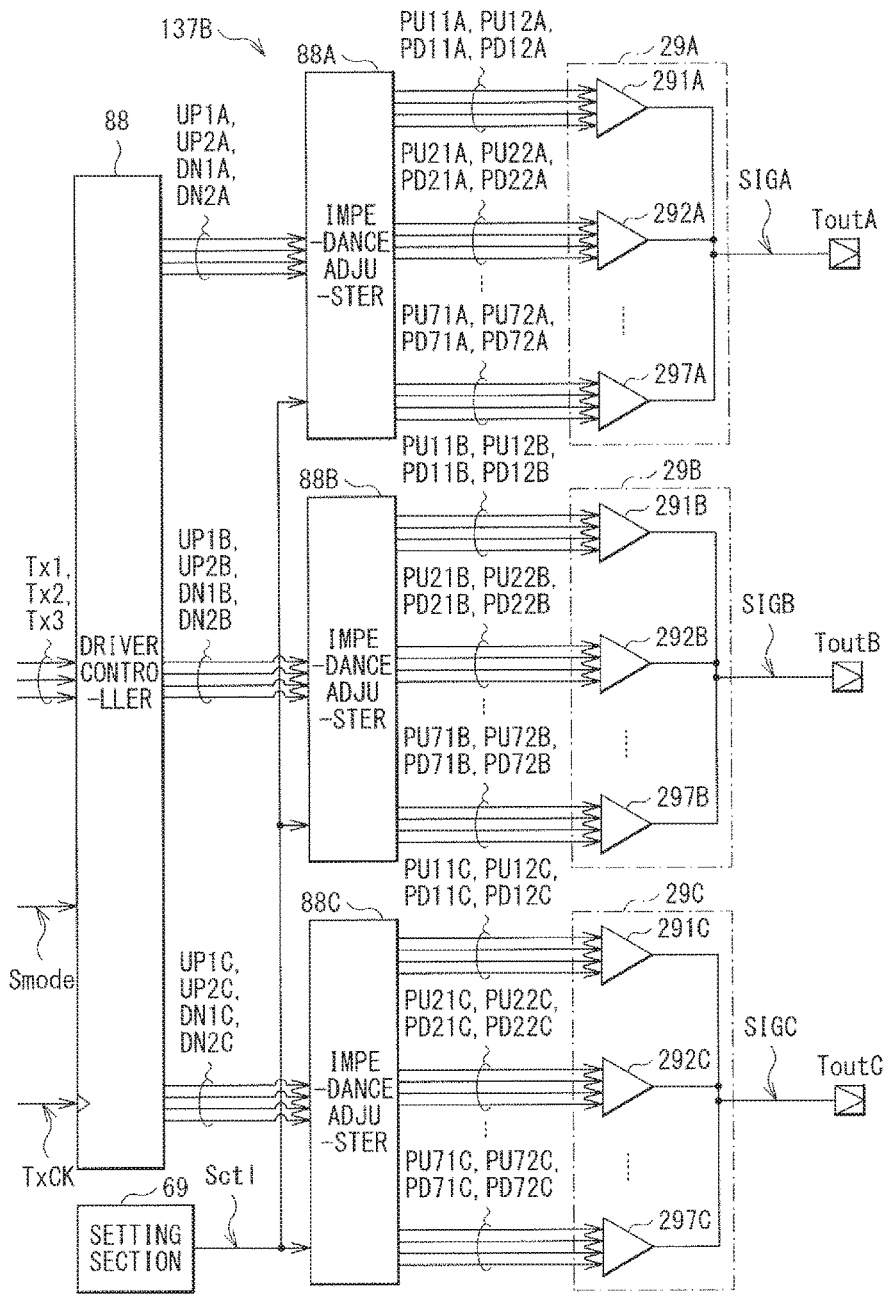
[Fig. 29]

[Fig. 30]
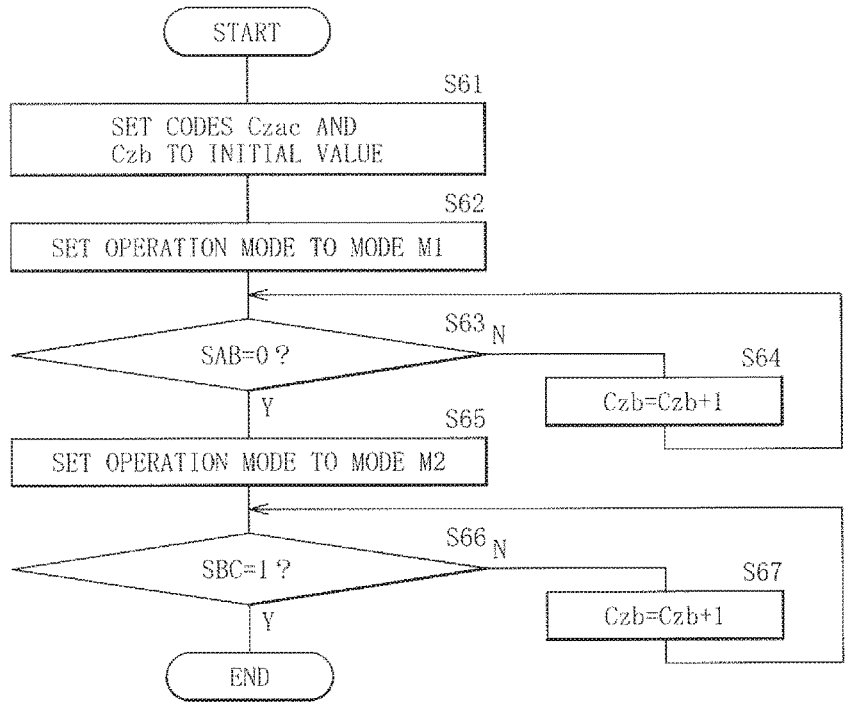
[Fig. 31]
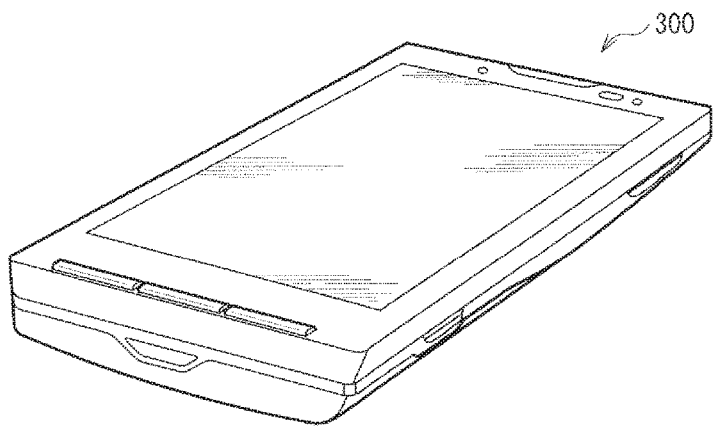

[Fig. 32]
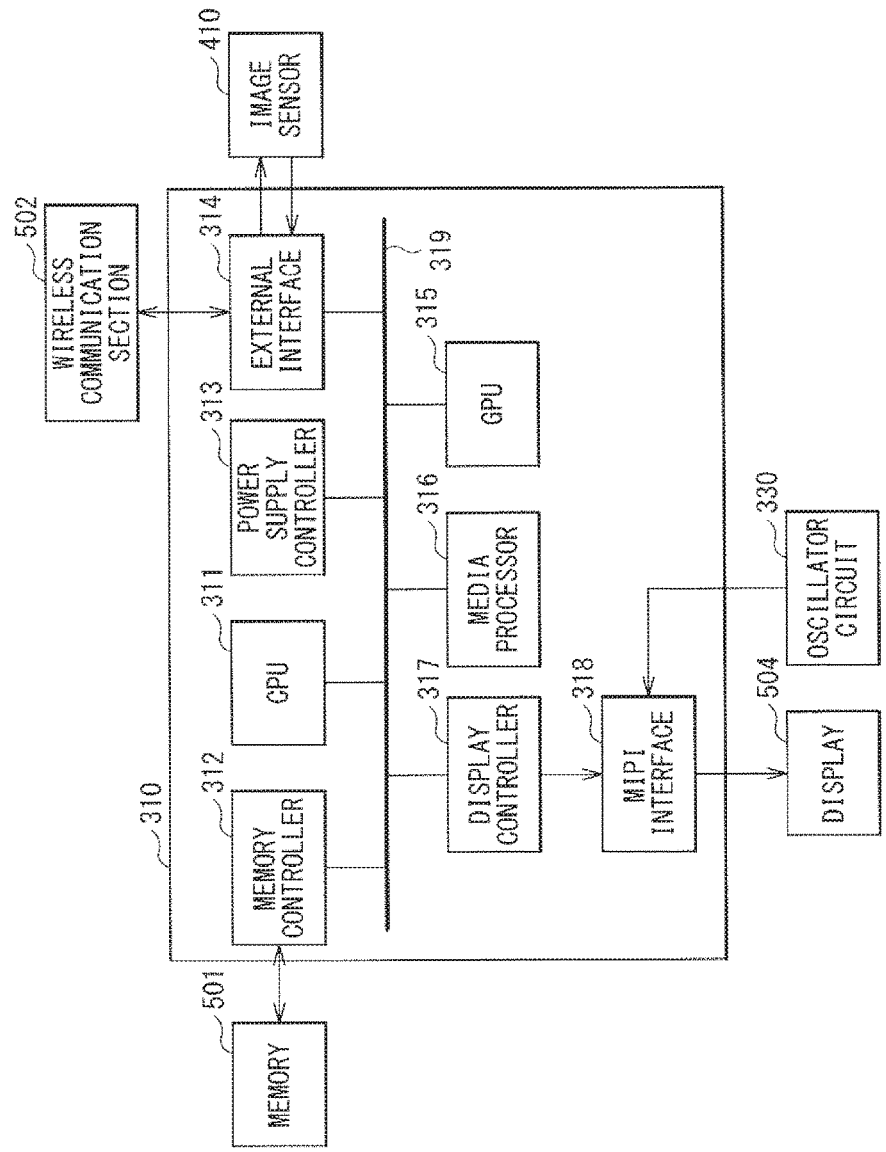

[Fig. 33]
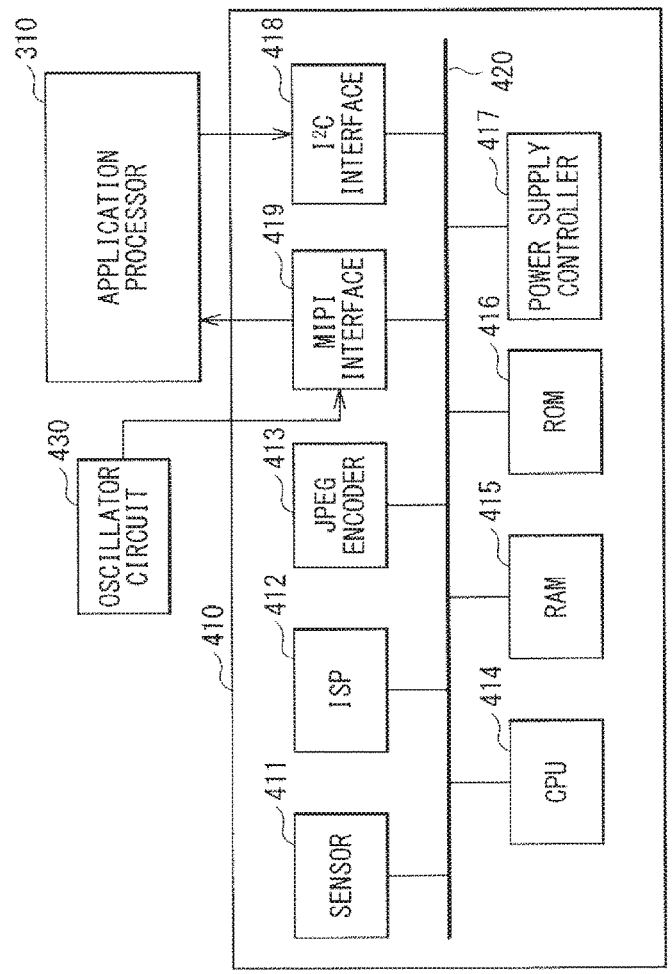
[Fig. 34]
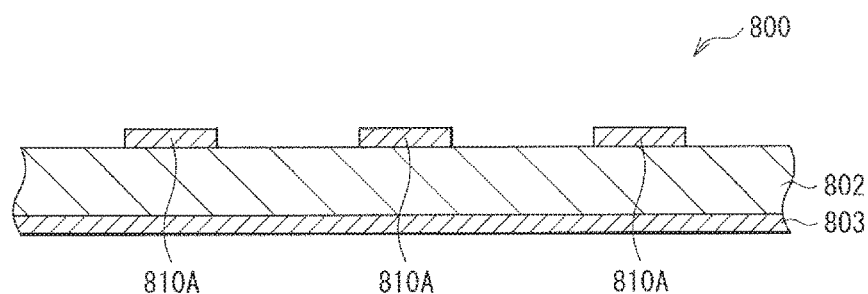

TRANSMISSION DEVICE, RECEPTION DEVICE, AND COMMUNICATION SYSTEM

CROSS REFERENCE TO RELATED APPLICATIONS

This application claims the benefit of Japanese Priority Patent Application No. JP 2015-158110 filed in the Japan patent office on Aug. 10, 2015, the entire contents of which are incorporated herein by reference.

TECHNICAL FIELD

The disclosure relates to a transmission device that transmits a signal, a reception device that receives a signal, and a communication system that transmits and receives a signal.

BACKGROUND ART

In association with high functionality and multi-functionality of electronic apparatuses in recent years, the electronic apparatuses include various devices such as a semiconductor chip, a sensor, and a display device. A lot of pieces of data are exchanged between these devices, and the amount of such data has been increased with high functionality and multi-functionality of the electronic apparatuses. Accordingly, the data are often exchanged with use of a high-speed interface. The high-speed interface may transmit and receive data at several Gbps, for example.

There have been disclosed various technologies for a method of increasing transmission capacity. For example, PTL 1 and PTL, 2 each disclose a communication system that transmits three differential signals through three transmission paths.

CITATION LIST

Patent Literature

PTL 1: Japanese Unexamined Patent Application Publication No. H06-261092.
PTL 2: U.S. Pat. No. 8,064,535

SUMMARY

Technical Problem

As described above, high communication performance is desired and further improvement in the communication performance is expected in communication systems.

It is desirable to provide a transmission device, a reception device, and a communication system that make it possible to improve communication performance.

Solution to Problem

A first transmission device according to an embodiment of the disclosure includes a transmitter. The transmitter includes a first output, a second output, and a third output, and is configured to transmit a symbol signal corresponding to a combination of signals of the first output, the second output, and the third output. An output impedance of the second output is lower than an output impedance of the first output.

A second transmission device according to an embodiment of the disclosure includes a transmitter. The transmitter includes a first output, a second output, and a third output, and is configured to transmit a symbol signal corresponding to a combination of signals of the first output, the second output, and the third output. A voltage amplitude of the signal of the second output is larger than a voltage amplitude of the signal of the first output.

A reception device according to an embodiment of the disclosure includes a receiver. The receiver includes a first input, a second input, and a third input, and is configured to receive a symbol signal corresponding to a combination of signals of the first input, the second input, and the third input. An input impedance of the second input is higher than an input impedance of the first input.

A communication system according to an embodiment of the disclosure is provided with a transmission device and a reception device. The transmission device includes a transmitter. The transmitter includes a first output, a second output, and a third output and is configured to transmit a symbol signal corresponding to a combination of signals of the first output, the second output, and the third output. An output impedance of the second output is lower than an output impedance of the first output.

The first transmission device and the communication system according to the embodiments of the disclosure each transmits the symbol signal corresponding to the combination of the signals of the first output, the second output, and the third output. The output impedance of the second output is lower than the output impedance of the first output.

The second transmission device according to the embodiment of the disclosure transmits the symbol signal corresponding to the combination of the signal of the first output, the second output, and the third output. The voltage amplitude of the signal of the second output is larger than the voltage amplitude of the signal of the first output.

The reception device according to the embodiment of the disclosure receives the symbol signal corresponding to the combination of the signals of the first input, the second input, and the third input. The input impedance of the second input is higher than the input impedance of the first input.

Advantageous Effects of Invention

According to the first transmission device and the communication system according to the embodiments of the disclosure, the output impedance of the second output is lower than the output impedance of the first output, which makes it possible to improve communication performance.

According to the second transmission device according to the embodiment of the disclosure, the voltage amplitude of the signal of the second output is larger than the voltage amplitude of the signal of the first output, which makes it possible to improve communication performance.

According to the reception device according to the embodiment of the disclosure, the input impedance of the second input is higher than the input impedance of the first input, which makes it possible to improve communication performance.

Note that effects described here are non-limiting. Effects achieved by the technology may be one or more of effects described in the disclosure.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorpo- FIG. 1 is a block diagram of a configuration example of a communication system according to a first embodiment of the disclosure.

FIG. 2 is an explanatory diagram of voltage states of signals to be transmitted and received by the communication system illustrated in FIG. 1.

FIG. 3 is an explanatory diagram of transition of a symbol to be transmitted and received by the communication system illustrated in FIG. 1.

FIG. 4 is a block diagram of a configuration example of a transmitter illustrated in FIG. 1.

FIG. 5 is a table illustrating an operation example of an output section illustrated in FIG. 4.

FIG. 6 is a block diagram of a configuration example of the output section illustrated in FIG. 4.

FIG. 7 is a circuit diagram of a configuration example of an impedance adjuster illustrated in FIG. 6.

FIG. 8 is a circuit diagram of a configuration example of a driver illustrated in FIG. 6.

FIG. 9 is a block diagram of a configuration example of a receiver illustrated in FIG. 1.

FIG. 10 is a waveform chart of an example of signals to be transmitted and received by the communication system illustrated in FIG. 1.

FIG. 11 is an explanatory diagram of an example of a receiving operation of the receiver illustrated in FIG. 9.

FIG. 12 is a cross-sectional view of a configuration example of a transmission path illustrated in FIG. 1.

FIG. 13 is a flow chart of an example of a calibration operation of the communication system illustrated in FIG. 1.

FIG. 14 is a table illustrating a characteristic example of the communication system illustrated in FIG. 1.

FIG. 15 is a flow chart of an example of a calibration operation of a communication system according to a modification example of the first embodiment.

FIG. 16 is a block diagram of a configuration example of a communication system according to a second embodiment.

FIG. 17 is a block diagram of a configuration example of an output section according to the second embodiment.

FIG. 18 is a table illustrating an example of a calibration operation of the communication system illustrated in FIG. 16.

FIG. 19 is a circuit diagram of a configuration example of an impedance adjuster illustrated in FIG. 17.

FIG. 20 is a flow chart of an example of a calibration operation of the communication system illustrated in FIG. 16.

FIG. 21 is a flow chart of an example of a calibration operation of a communication system according to a modification example of the second embodiment.

FIG. 22 is a block diagram of a configuration example of a communication system according to a third embodiment.

FIG. 23 is a block diagram of a configuration example of an output section according to the third embodiment.

FIG. 24 is a flow chart of an example of a calibration operation of the communication system illustrated in FIG. 22.

FIG. 25 is a block diagram of a configuration example of a communication system according to a fourth embodiment.

FIG. 26 is a block diagram of a configuration example of a receiver illustrated in FIG. 25.

FIG. 27 is a flow chart of an example of a calibration operation of the communication system illustrated in FIG. 25.

FIG. 28 is a block diagram of a configuration example of a communication system according to a fifth embodiment.

FIG. 29 is a block diagram of a configuration example of an output section according to the fifth embodiment.

FIG. 30 is a flow chart of an example of a calibration operation of the communication system illustrated in FIG. 28.

FIG. 31 is a perspective view of an appearance configuration of a smartphone to which the communication system according to any of the embodiments is applied.

FIG. 32 is a block diagram of a configuration example of an application processor to which the communication system according to any of the embodiments is applied.

FIG. 33 is a block diagram of a configuration example of an image sensor to which the communication system according to any of the embodiments is applied.

FIG. 34 is a cross-sectional view of a configuration example of a transmission path according to a modification example.

DESCRIPTION OF EMBODIMENTS

Some embodiments of the disclosure are described in detail below with reference to drawings. It is to be noted that description is given in the following order.
1. First Embodiment (An example 1 in which output impedance is adjusted)
2. Second Embodiment (An example 2 in which output impedance is adjusted)
3. Third Embodiment (An example in which output amplitude is adjusted)
4. Fourth Embodiment (An example 1 in which input impedance is adjusted)
5. Fifth Embodiment (An example 2 in which input impedance is adjusted)
6. Application Examples

1. First Embodiment

CONFIGURATION EXAMPLE

FIG. 1 illustrates a configuration example of a communication system including a transmission path according to a first embodiment. A communication system 1 is adapted to perform communication by means of a signal having three voltage levels.

The communication system 1 may include a transmission device 10, a transmission path 100, and a reception device 30. The transmission device 10 may include three output terminals ToutA, ToutB, and ToutC. The transmission path 100 may include lines 110A, 110B, and 110C. The reception device 30 may include three input terminals TinA, TinB, and TinC. The output terminal ToutA of the transmission device 10 and the input terminal TinA of the reception device are coupled to each other through the line 10A. The output terminal ToutB of the transmission device 10 and the input terminal TinB of the reception device 30 are coupled to each other through the line 110B. The output terminal ToutC of the transmission device 10 and the input terminal TinC of the reception device 30 are coupled to each other through the line 110C. Characteristic impedances of the lines 110A to 110C each are about 50 [Ω] in this example.

The transmission device 10 respectively outputs a signal SIGA, a signal SIGB, and a signal SIGC from the output terminal ToutA, the output terminal ToutB, and the output terminal ToutC. The reception device 30 respectively receives the signal SIGA, the signal SIGB, and the signal SIGC through the input terminal TinA, the input terminal TinB, and the input terminal TinC. The signals SIGA, SIGB, and SIGC each make transition involving three voltage levels (i.e., a high-level voltage VH, a medium-level voltage VM, and a low-level voltage VL).

FIG. 2 illustrates voltage states of the signals SIGA, SIGB, and SIGC. The transmission device 10 uses the three signals SIGA, SIGB, and SIGC to transmit six symbols "+x", "−x", "+y", "−y", "+z", and "−z". For example, when the transmission device 10 transmits the symbol "+x", the transmission device 10 may respectively set the signal SIGA, the signal SIGB, and the signal SIGC to the high-level voltage VH, the low-level voltage VL, and the medium-level voltage VM. When the transmission device 10 transmits the symbol "−x", the transmission device 10 may respectively set the signal SIGA, the signal SIGB, and the signal SIGC to the low-level voltage VL, the high-level voltage VH, and the medium-level voltage VM. When the transmission device 10 transmits the symbol "+y", the transmission device 10 may respectively set the signal SIGA, the signal SIGB, and the signal SIGC to the medium-level voltage VM, the high-level voltage VH, and the low-level voltage VL. When the transmission device 10 transmits the symbol "−y", the transmission device 10 may respectively set the signal SIGA, the signal SIGB, and the signal SIGC to the medium-level voltage VM, the low-level voltage VL, and the high-level voltage VH. When the transmission device 10 transmits the symbol "+z", the transmission device 10 may respectively set the signal SIGA, the signal SIGB, and the signal SIGC to the low-level voltage VL, the medium-level voltage VM, and the high-level voltage VH. When the transmission device 10 transmits the symbol "−z", the transmission device 10 may respectively set the signal SIGA, the signal SIGB, and the signal SIGC to the high-level voltage VH, the medium-level voltage VM, and the low-level voltage VL.

The transmission path 100 is adapted to transmit a sequence of symbols by means of such signals SIGA, SIGB, and SIGC. More specifically, the line 110A, the line 110B, and the line 110C respectively carry the signal SIGA, the signal SIGB, and the signal SIGC to cause the transmission path 100 to carry the sequence of the symbols. In other words, the three lines 110A, 110B, and 110C serve as one trio of lines that carries the sequence of the symbols.

(Transmission Device 10)

The transmission device 10 may include a clock generator 11, a processor 12, a transmitter 20, a receiver 14, and a controller 15 as illustrated in FIG. 1.

The clock generator 11 is adapted to generate a clock signal TxCK. A frequency of the clock signal TxCK may be about 2.5 [GHz], for example. The clock generator 11 may be configured of a phase locked loop (PLL), for example. The clock generator 11 may generate the clock signal TxCK, for example, based on an unillustrated reference clock supplied from the outside of the transmission device 10. Further, the clock generator 11 supplies the processor 12 and the transmitter 20 with the clock signal TxCK.

The processor 12 is adapted to perform predetermined processing to generate transition signals TxF0 to TxF6, TxR0 to TxR6, and TxP0 to TxP6. Here, a group of the transition signals TxF0, TxR0, and TxP0 indicates symbol transition in a sequence of symbols that is to be transmitted by the transmission device 10. Likewise, a group of the transition signals TxF1, TxR1, and TxP1, a group of the transition signals TxF2, TxR2, and TxP2, a group of the transition signals TxF3, TxR3, and TxP3, a group of the transition signals TxF4, TxR4, and TxP4, a group of the transition signals TxF5, TxR5, and TxP5, and a group of the transition signals TxF6, TxR6, and TxP6 each indicate symbol transition. In other words, the processor 12 generates seven groups of transition signals. Hereinafter, on an as-needed basis, a transition signal TxF indicates one of the transition signals TxF0 to TxF6, a transition signal TxR indicates one of the transition signals TxR0 to TxR6, and a transition signal TxP indicates one of transition signals TxP0 to TxP6.

FIG. 3 illustrates a relationship between the transition signals TxF, TxR, and TxP and symbol transition. Numerical values of three digits given to each transition indicate values of the transition signals TxF, TxR, and TxP in this order.

The transition signal TxF (Flip) causes symbol transition between "+x" and "−x", between "+y" and "−y", and between "+z" and "−z". More specifically, when the transition signal TxF is "1", transition is so performed as to change polarity of the symbol (for example, from "+x" to "−x"), and when the signal TxF is "0", such transition is not performed.

The transition signals TxR (Rotation) and TxP (Polarity) each cause symbol transition between "+x" and a symbol other than "−x", between "+y" and a symbol other than "−y", and between "+z" and a symbol other than "−z" when the signal TxF is "0". More specifically, when the transition signals TxR and TxP are respectively "1" and "0", transition is made in a clockwise direction in FIG. 3 while keeping the polarity of the symbol (for example, from "+x" to "+y"), and when the signals TxR and TxP are respectively "1" and "1", transition is made in the clockwise direction in FIG. 3 while changing the polarity of the symbol (for example, from "+x" to "−y"). Moreover, when the transition signals TxR and TxP are respectively "0" and "0", transition is made in a counterclockwise direction in FIG. 3 while keeping the polarity of the symbol (for example, from "+x" to "+z"), and when the transition signals TxR and TxP are respectively "0" and "1", transition is made in the counterclockwise direction in FIG. 3 while changing the polarity of the symbol (for example, from "+x" to "−z").

The processor 12 generates seven groups of the transition signals TxF, TxR, and TxP. Further, the processor 12 supplies the transmitter 20 with the seven groups of the transition signals TxF, TxR, and TxP (the transition signals TxF0 to TxF6, TxR0 to TxR6, and TxP0 to TxP6).

Moreover, the processor 12 may include a data generator 19. The data generator 19 is adapted to generate data for calibration (transition signals) that has a predetermined data pattern. With this configuration, the processor 12 outputs the data for calibration as the seven groups of the transition signals TxF, TxR, and TxP in a calibration mode. The data for calibration is generated by the data generator 19.

The transmitter 20 is adapted to generate the signals SIGA, SIGB, and SIGC, based on the transition signals TxF0 to TxF6, TxR0 to TxR6, and TxP0 to TxP6. Further, the transmitter 20 also has a function of setting an output impedance, based on control signals Sctl1 and Sctl2.

FIG. 4 illustrates a configuration example of the transmitter 20. The transmitter 20 may include serializers 21 to 23, a transmission symbol generator 24, and an output section 27.

The serializer 21 is adapted to serialize the transition signals TxF0 to TxF6 in this order, based on the transition signals TxF0 to TxF6 and the clock signal TxCK, to generate a transition signal TxF9. The serializer 22 is adapted to serialize the transition signals TxR0 to TxR6 in this order, based on the transition signals TxR0 to TxR6 and the clock signal TxCK, to generate a transition signal TxR9. The serializer 23 is adapted to serialize the transition signals TxP0 to TxP6 in this order, based on the transition signals TxP0 to TxP6 and the clock signal TxCK, to generate a transition signal TxP9.

The transmission symbol generator 24 is adapted to generate symbol signals Tx1, Tx2, and Tx3, based on the transition signals TxF9, TxR9, and TxP9 and the clock signal TxCK. The transmission symbol generator 24 may include a signal generator 25 and a flip-flop 26.

The signal generator 25 is adapted to generate the symbol signal Tx1, Tx2, and Tx3, based on the transition signals TxF9, TxR9, and TxP9 and symbol signals D1, D2, and D3. More specifically, the signal generator 25 determines a symbol after transition as illustrated in FIG. 3, based on a symbol indicated by the symbol signals D1, D2, and D3 (a symbol before transition) and the transition signals TxF9, TxR9, and TxP9, and outputs the symbol after transition as the symbol signals Tx1, Tx2, and Tx3.

The flip-flop 26 is adapted to sample the symbol signals Tx1, Tx2, and Tx3, based on the clock signal TxCK and respectively output thus-obtained sampling results of the symbol signals Tx1, Tx2, and Tx3 as symbol signals D1, D2, and D3.

The output section 27 is adapted to generate the signals SIGA, SIGB, and SIBC, based on the symbol signals Tx1, Tx2, and Tx3, and the clock signal TxCK.

FIG. 5 illustrates an operation example of the output section 27. For example, in a case in which the symbol signal Tx1, Tx2, and Tx3 are respectively "1", "0", and "0", the output section 27 may respectively set the signal SIGA, the signal SIGB, and the signal SIGC to the high-level voltage VH, the low-level voltage VL, and the medium-level voltage VM. In other words, the output section 27 may generate the symbol "+x". Moreover, for example, in a case in which the symbol signals Tx1, Tx2, and Tx3 are respectively "0", "1", and "1", the output section 27 may respectively set the signal SIGA, the signal SIGB, and the signal SIGC to the low-level voltage VL, the high-level voltage VH, and the medium-level voltage VM. In other words, the output section 27 may generate the symbol "−x". Further, for example, in a case in which the symbol signals Tx1, Tx2, and Tx3 are respectively "0", "1", and "0", the output section 27 may respectively set the signal SIGA, the signal SIGB, and the signal SIGC to the medium-level voltage VM, the high-level voltage VH, and the low-level voltage VL. In other words, the output section 27 may generate the symbol "+y". For example, in a case in which the symbol signals Tx1, Tx2, and Tx3 are respectively "1", "0", and "1", the output section 27 may respectively set the signal SIGA, the signal SIGB, and the signal SIGC to the medium-level voltage VM, the low-level voltage VL, and the high-level voltage VH. In other words, the output section 27 may generate the symbol "−y". For example, in a case in which the symbol signal Tx1, Tx2, and Tx3 are respectively "0", "0", and "1", the output section 27 may respectively set the signal SIGA, the signal SIGB, and the signal SIGC to the low-level voltage VL, the medium-level voltage VM, and the high-level voltage VW In other words, the output section 27 may generate the symbol "+z". For example, in a case in which the symbol signal Tx1, Tx2, and Tx3 are respectively "1", "1", and "0", the output section 27 may respectively set the signal SIGA, the signal SIGB, and the signal SIGC to the high-level voltage VH, the medium-level voltage VM, and the low-level voltage VL. In other words, the output section 27 may generate the symbol "−z".

Moreover, the output section 27 also has a function of setting an output impedance, based on the control signal Sctl1 and Sctl2 as will be described later.

FIG. 6 illustrates a configuration example of the output section 27. The output section 27 may include a driver controller 28, impedance adjusters 28A, 28B, and 28C, and driver sections 29A, 29B, and 29C.

The driver controller 28 is adapted to generate control signals UP1A, UP2A, DN1A, DN2A, UP1B, UP2B, DN1B, DN2B, UP1C, UP2C, DN1C, and DN2C, based on the symbol signals Tx1, Tx2, and Tx3, the control signals Sctl1 and Sctl2, and the clock signal TxCK. Further, the driver controller 28 supplies the impedance adjuster 28A with the control signals UP1A, UP2A, DN1A, and DN2A. The driver controller 28 supplies the impedance adjuster 28B with the control signal UP1B, UP2B, DN1B, and DN2B. The driver controller 28 supplies the impedance adjuster 28C with the control signals UP1C, UP2C, DN1C, and DN2C.

The impedance adjuster 28A is adapted to generate control signal PU11A, PU12A, PD12A, PU21A, PU22A, PD21A, PD22A, . . . , PU71A, PU72A, PD71A, and PD72A, based on the control signals UP1A, UP2A, DN1A, and DN2A. Further, the impedance adjuster 28A also has a function of setting, based on the control signal Sctl1, the number of drivers to be used out of after-mentioned seven drivers 291A to 297A included in the driver section 29A to adjust an output impedance Zoa of the driver section 29A.

Likewise, the impedance adjuster 28B is adapted to generate control signals PU11B, PU12B, PD11B, PD12B, PU21B, PU22B, PD21B, PD22B, . . . , PU71B, PU72B, PD71B, and PD72B, based on the control signals UP1B, UP2B, DN1B, and DN2B. Further, the impedance adjuster 28B also has a function of setting, based on the control signal Sctl2, the number of drivers to be used out of after-mentioned seven drivers 291B to 297B included in the driver section 29B to adjust an output impedance Zob of the driver section 29B.

Likewise, the impedance adjuster 28C is adapted to generate control signals PU11C, PU12C, PD11C, PD12C, PU21C, PU22C, PD21C, PD22C, . . . , PU71C, PU72C, PD71C, and PD72C, based on the control signals UP1C, UP2C, DN1C, and DN2C. Further, the impedance adjuster 28C also has a function of setting, based on the control signal Sctl1, the number of drivers to be used out of after-mentioned seven drivers 291C to 297C included in the driver section 29C to adjust an output impedance Zoc of the driver section 29C.

FIG. 7 illustrates a configuration example of the impedance adjuster 28A. The impedance adjuster 28A may include an impedance controller 289A and AND circuit sections 281A to 287A.

The impedance controller 289A is adapted to generate control signals SEL1 to SEL7, based on the control signal Sctl1.

The AND circuit section 281A is adapted to generate the control signals PU11A, PU12A, PD11A, and PD12A, based on the control signals UP1A, UP2A, DN1A, and DN2A and the control signal SEL1. The AND circuit section 281A may include AND circuits 2811A to 2814A. A first input terminal and a second input terminal of the AND circuit 2811A are respectively supplied with the control signal UP1A and the control signal SEL1, and an output terminal of the AND circuit 2811A outputs the control signal PU11A. A first input terminal and a second input terminal of the AND circuit 2812A are respectively supplied with the control signal UP2A and the control signal SEL1, and an output terminal of the AND circuit 2812A outputs the control signal PU12A. A first input terminal and a second input terminal of the AND circuit 2813A are respectively supplied with the control signal DN1A and the control signal SEL1, and an output terminal of the AND circuit 2813A outputs the control signal PD11A. A first input terminal and a second input terminal of the AND circuit 2814A are respectively supplied with the control signal DN2A and the control signal SEL1, and an output terminal of the AND circuit 2814A outputs the control signal PD12A.

Likewise, the AND circuit section 282A is adapted to generate the control signals PU21A, PD22A, PD21A, and PD22A, based on the control signals UP1A, UP2A, DN1A, and DN2A and the control signal SEL2. The AND circuit section 283A is adapted to generate the control signal PU31A, PU32A, PD31A, and PD32A, based on the control signal UP1A, UP2A, DN1A, and DN2A and the control signal SEL3. The AND circuit section 284A is adapted to generate the control signals PU41A, PU42A, PD41A, and PD42A, based on the control signals UP1A, UP2A, DN1A, and DN2A and the control signal SEL4. The AND circuit section 285A is adapted to generate the control signals PU51A, PU52A, PD51A, and PD52A, based on the control signals UP1A, UP2A, DN1A, and DN2A and the control signal SEL5. The AND circuit section 286A is adapted to generate the control signals PU61A, PU62A, PD61A, and PD62A, based on the control signals UP1A, UP2A, DN1A, and DN2A and the control signal SEL6. The AND circuit section 287A is adapted to generate the control signals PU71A, PU72A, PD71A, and PD72A, based on the control signals UP1A, UP2A, DN1A, and DN2A and the control signal SEL7.

It is to be noted that description is given here of the impedance adjuster 28A as an example, and the same description applies to the impedance adjusters 28B and 28C. The impedance adjuster 28B may include an impedance controller 289B and AND circuit sections 281B to 287B. The impedance adjuster 28C may include an impedance controller 289C and AND circuit sections 281C to 287C. The impedance controller 289B is adapted to generate the control signals SEL1 to SEL7 to be used in the impedance adjuster 28B, based on the control signal Sctl2. The impedance controller 289C is adapted to generate the control signals SEL1 to SEL7 to be used in the impedance adjuster 28C, based on the control signal Sctl1. The AND circuit sections 281B to 287B and 281C to 287C have similar functions as the functions of the AND circuit sections 281A to 287A.

The driver section 29A (see FIG. 6) is adapted to generate the signal SIGA, based on the control signals PU11A, PU12A, PD11A, PD12A, PU21A, PU22A, PD21A, PD22A, . . . , PU71A, PU72A, PD71A, and PD72A. The driver section 29A includes seven drivers 291A to 297A in this example. The driver 291A is adapted to operate, based on the control signal PU11A, PU12A, PD11A, and PD12A. The driver 292A is adapted to operate, based on the control signal PU21A, PU22A, PD21A, and PD22A. The drivers 293A to 296A are adapted to operate in a similar way. The driver 297A is adapted to operate, based on the control signals PU71A, PU72A, PD71A, and PD72A. Output terminals of the drivers 291A to 297A are coupled to one another, and are coupled to the output terminal ToutA.

The driver section 29B is adapted to generate the signal SIGB, based on the control signal PU11B, PU12B, PD11B, PD12B, PU21B, PU22B, PD21B, PD22B, . . . , PU71B, PU72B, PD71B, and PD72B. The driver section 29B includes seven drivers 291B to 297B in this example. The driver 291B is adapted to operate, based on the control signals PU11B, PU12B, PD11B, and PD12B. The driver 292B is adapted to operate, based on the control signals PU21B, PU22B, PD21B, and PD22B. The drivers 293B to 296B are adapted to operate in a similar way. The driver 297B is adapted to operate, based on the control signals PU71B, PU72B, PD71B, and PD72B. Output terminals of the drivers 291B to 297B are coupled to one another, and are coupled to the output terminal ToutB.

The driver section 29C is adapted to generate the signal SIGC, based on the control signals PU11C, PU12C, PD11C, PD12C, PU21C, PU22C, PD21C, PD22C, . . . , PU71C, PU72C, PD71C, and PD72C. The driver section 29C includes seven drivers 291C to 297C in this example. The driver 291C is adapted to operate, based on the control signals PU11C, PU12C, PD11C, and PD12C. The driver 292C is adapted to operate, based on the control signals PU21C, PU22C, PD21C, and PD22C. The drivers 293C to 296C are adapted to operate in a similar way. The driver 297C is adapted to operate, based on the control signals PU71C, PU72C, PD71C, and PD72C. Output terminals of the drivers 291C to 297C are coupled to one another, and are coupled to the output terminal ToutC.

FIG. 8 illustrates a configuration example of the driver 291A. It is to be noted that the drivers 292A to 297A, 291B to 297B, and 291C to 297C are similar to the driver 291A. The driver 291A may include transistors 91, 94, 95, and 98, and resistor 92, 93, 96, and 97. The transistors 91, 94, 95, and 98 in this example are N-channel metal oxide semiconductor (MOS) field effect transistors (FETs). A gate and a drain of the transistor 91 are respectively supplied with the control signal PU11A and a voltage V1. A source of the transistor 91 is coupled to a first end of the resistor 92. A gate of the transistor 94 is supplied with the control signal PD11A. A drain of the transistor 94 is coupled to a first end of the resistor 93. A source of the transistor 94 is grounded. A gate and a drain of the transistor 95 are respectively supplied with the control signal PU12A and the voltage V1. A source of the transistor 95 is coupled to a first end of the resistor 96. A gate of the transistor 98 is supplied with the control signal PD12A. A drain of the transistor 98 is coupled to a first end of the resistor 97. A source of the transistor 98 is grounded. The first end of the resistor 92 is coupled to the source of the transistor 91. A second end of the resistor 92 is coupled to second ends of the resistors 93, 96, and 97 and the output terminal ToutA of the transmission device 10. The first end of the resistor 93 is coupled to the drain of the transistor 94. The second end of the resistor 93 is coupled to the second ends of the resistors 92, 96, and 97 and the output terminal ToutA of the transmission device 10. The first end of the resistor 96 is coupled to the source of the transistor 95, and the second end of the resistor 96 is coupled to the second ends of the resistors 92, 93, and 97 and the output terminal ToutA of the transmission device 10. The first end of the resistor 97 is coupled to the drain of the transistor 98, and the second end of the resistor 97 is coupled to the second ends of the resistors 92, 93, and 96 and the output terminal ToutA of the transmission device 10. In this example, the sum of a resistance value of on resistance of the transistor 91 and a resistance value of the resistor 92 is about 400 [Ω]. Likewise, the sum of a resistance value of on resistance of the transistor 94 and a resistance value of the resistor 93 is about 400 [Ω]. Moreover, the sum of a resistance value of on resistance of the transistor 95 and a resistance value of the resistor 96 is about 400 [Ω]. Likewise, the SUM of a resistance value of on resistance of the transistor 98 and a resistance value of the resistor 97 is about 400 [Ω].

With this configuration, the driver controller 28 sets a voltage of the output terminal ToutA to one of the three voltages (the high-level voltage VH, the low-level voltage VL, and the medium-level voltage VM) by means of the control signals UP1A, UP2A, DN1A, and DN2A. More specifically, for example, in a case in which the voltage of the output terminal ToutA is set to the high-level voltage VH, the driver controller 28 may set the control signals UP1A and UP2A to "1", and may set the control signals DN1A and DN2A to "0". It is to be noted that in this example, the impedance controller 289A sets the control signals SEL1 to SEL4 to "1" and sets the control signals SEL5 to SEL7 to "0", based on the control signal Sctl1. Accordingly, the control signals PU11A, PU12A, PU21A, PU22A, PU31A, PU32A, PU41A, and PU42A out of 28 control signals to be supplied to the driver section 29A may be set to "1", and the remaining control signals may be set to "0". At this occasion, in the driver section 29A, eight transistors 91 and 95 in four drivers 291A to 294A may be turned on. As a result, the signal SIGA may be set to the high-level voltage VH, and an output termination resistance (output impedance) of the driver section 29A may become about 50 [Ω]. Moreover, for example, in a case in which the voltage of the output terminal ToutA is set to the low-level voltage VL, the driver controller 28 may set the control signal DN1A and DN2A to "1" and may set the control signals UP1A and UP2A to "0". Accordingly, the control signals PD11A, PD21A, PD22A, PD31A, PD32A, PD41A, and PD42A out of 28 control signals to be supplied to the driver section 29A may be set to "1", and the remaining control signals may be set to "0". At this occasion, in the driver section 29A, eight transistors 94 and 98 in the four drivers 291A to 294A may be turned on. As a result, the signal SIGA may be set to the low-level voltage VL, and the output termination resistance (output impedance) of the driver section 29A may become about 50 [Ω]. Further, in a case in which the voltage of the output terminal ToutA is set to the medium-level voltage VM, the driver controller 28 may set the control signal UP1A and DN1A to "1" and may set the control signal UP2A and DN2A to "0", for example. Accordingly, the control signals PU11A, PD11A, PU21A, PD21A, PU31A, PD31A, PU41A, and PD41A out of 28 control signals to be supplied to the driver section 29A may be set to "1", and the remaining control signals may be set to "0". At this occasion, in the driver section 29A, eight transistors 91 and 94 in the four drivers 291A to 294A may be turned on. As a result, the signal SIGA may be set to the medium-level voltage VM, and the output termination resistance (output impedance) of the driver section 29A may become about 50 [Ω]. Thus, the driver controller 28 sets the voltage of the output terminal ToutA to one of the three voltages by means of the control signals PU1A to PU7A and PD1A to PD7A.

Moreover, the impedance controller 289A varies the number of drivers to be used out of the drivers 291A to 297A, 291B to 297B, and 291C to 297C, based on the control signals Sctl1 and Sctl2 to vary the output impedance Zoa of the driver section 29A, the output impedance Zob of the driver section 29B, and the output impedance Zoc of the driver section 29C. More specifically, for example, the impedance controller 289A may increase the number of control signals to be set to "1" out of the control signals SEL1 to SEL7 to decrease the output impedance Zoa, and may decrease the number of control signals to be set to "1" out of the control signals SEL1 to SEL7 to increase the output impedance Zoa. The impedance controller 289B and 289C are similar to the impedance controller 289A.

The receiver 14 is adapted to receive the control signal CTL supplied from the reception device 30 and supply the controller 15 with after-mentioned comparison result information INF included in the control signal CTL.

The controller 15 is adapted to set the output impedances Zoa, Zob, and Zoc of the driver sections 29A, 29B, and 29C. More specifically, the controller 15 generates the control signals Sctl1 and Sctl2, based on the comparison result information INF, and supplies the driver controller 28 of the transmitter 20 with the control signals Sctl1 and Sctl2. The control signal Sctl1 may include a code Czac. The code Czac indicates the output impedances Zoa and Zoc of the driver sections 29A and 29C. The output impedances Zoa and Zoc are decreased with a decrease in the value of the code Czac, whereas the output impedance Zoa and Zoc are increased with an increase in the value of the code Czac. Moreover, the control signal Sctl2 may include a code Czb. The code Czb indicates the output impedance Zob of the driver section 29B. The output impedance Zob is decreased with a decrease in a value of the code Czb, whereas the output impedance Zob is increased with an increase in the value of the code Czb. This makes it possible for the controller 15 to set the output impedances Zoa, Zob, and Zoc of the driver sections 29A, 29B, and 29C.

(Reception Device 40)

The reception device 30 may include a receiver 31, a processor 32, and a transmitter 33, as illustrated in FIG. 1.

The receiver 40 is adapted to receive the signals SIGA, SIGB, and SIGC and generate transition signals RxF, RxR, and RxP and a clock signal RxCK, based on the signals SIGA, SIGB, and SIGC.

FIG. 9 illustrates a configuration example of the receiver 40. The receiver 40 may include resistors 41A, 41B, and 41C, amplifiers 42A, 42B, and 42C, a clock generator 43, flip-flops 44 and 45, a signal generator 46.

The resistors 41A, 41B, and 41C each function as a terminator in the communication system 1. A first end of the resistor 41A is coupled to the input terminal TinA, and is supplied with the signal SIGA. A second end of the resistor 41A is coupled to second ends of the resistors 41B and 41C. A first end of the resistor 41B is coupled to the input terminal TinB, and is supplied with the signal SIGB. The second end of the resistor 41B is coupled to the second ends of the resistors 41A and 41C. A first end of the resistor 41C is coupled to the input terminal TinC, and is supplied with the signal SIGC. The second end of the resistor 41C is coupled to the second ends of the resistors 41A and 41B.

Each of the amplifiers 42A, 42B, and 42C is adapted to output a signal corresponding to a difference between a signal of its positive input terminal and a signal of its negative input terminal. The positive input terminal of the amplifier 42A is coupled to the negative input terminal of the amplifier 42C and the first end of the resistor 41A, and is supplied with the signal SIGA. The negative input terminal of the amplifier 42A is coupled to the positive input terminal of the amplifier 42B and the first end of the resistor 41B, and is supplied with the signal SIGB. The positive input terminal of the amplifier 42B is coupled to the negative input terminal of the amplifier 42A and the first end of the resistor 41B, and is supplied with the signal SIGB. The negative input terminal of the amplifier 42B is coupled to the positive input terminal of the amplifier 42C and the first end of the resistor 41C, and is supplied with the signal SIGC. The positive input terminal of the amplifier 42C is coupled to the negative input terminal of the amplifier 42B and the first end of the resistor 41C, and is supplied with the signal SIGC. The negative input terminal of the amplifier 42C is coupled to the positive input terminal of the amplifier 42A and the first end of the resistor 41A, and is supplied with the signal SIGA.

With this configuration, the amplifiers 42A, 42B, and 42C respectively output signals SAB, SBC, and SCA. The signal SAB corresponds to a difference DAB (=SIGA−SIGB) between the signal SIGA and the signal SIGB. The signal SBC corresponds to a difference DBC (=SIGB−SIGC) between the signal SIGB and the signal SIGC. The signal SCA corresponds to a difference DCA (=SIGC−SIGA) between the signal SIGC and the signal SIGA.

FIG. 10 illustrates an example of the signals SIGA to SIGC received by the receiver 40. In this example, the receiver 40 receives six symbols "+x", "−y", "−z", "+z", "+y", and "−x" in this order. At this occasion, the voltage of the signal SIGA varies in order of VH, VM, VH, VL, VM, and VL, the voltage of the signal SIGB varies in order of VL, VL, VM, VM, VH, and VH, and the voltage of the signal SIGC varies in order of VM, VH, VL, VH, VL, and VM, thereby varying the differences DAB, DBC, and DCA as well. For example, the difference DAB may vary in order of +2ΔV, +ΔV, +αV, −ΔV, −ΔV, and −2ΔV, the difference DBC may vary in order of −ΔV, −2ΔV, +ΔV, −ΔV, +2ΔV, and +2ΔV, and the difference DCA may vary in order of −ΔV, +ΔV, −2ΔV, +2ΔV, −ΔV, and +ΔV. Here, ΔV is a difference between two adjacent voltages out of the three voltages (the high-level voltage VH, the medium-level voltage VM, and the low-level voltage VL).

FIG. 11 illustrates an operation example of the amplifiers 42A, 42B, and 42C in a case in which the receiver 40 receives the symbol "+x". In this example, the voltage of the signal SIGA is at the high-level voltage VH, the voltage of the signal SIGB is at the low-level voltage VL, and the voltage of the signal SIGC is at the medium-level voltage VM. In this case, a current Iin flows in order of the input terminal TinA, the resistor 41A, the resistor 41B, and the input terminal TinB. Further, the positive input terminal and the negative input terminal of the amplifier 42A are respectively supplied with the high-level voltage VH and the low-level voltage VL to cause the difference DAB to be positive. The output signal SAB of the amplifier 42A therefore becomes "1". Moreover, the positive input terminal and the negative input terminal of the amplifier 42B are supplied with the low-level voltage VL and the medium-level voltage VM to cause the difference DBC to be negative. The output signal SAB of the amplifier 42B therefore becomes "0". Further, the positive input terminal and the negative input terminal of the amplifier 42C are respectively supplied with the medium-level voltage VM and the high-level voltage VH to cause the difference DCA to be negative. The output signal SCA of the amplifier 42C therefore becomes "0".

The clock generator 43 is adapted to generate the clock signal RxCK, based on the output signals SAB, SBC, and SCA of the amplifiers 42A, 42B, and 42C.

The flip-flop 44 is adapted to delay the output signals SAB, SBC, and SCA of the amplifiers 42A, 42B, and 42C by one clock of the clock signal RxCK and output the thus-delayed output signals SAB, SBC, and SCA. The flip-flop 45 is adapted to delay three output signals of the flip-flop 44 by one clock of the clock signal RxCK and output the thus-delayed output signals.

The signal generator 46 is adapted to generate the transition signals RxF, RxR, and RxP, based on the output signals of the flip-flops 44 and 45 and the clock signal RxCK. The transition signals RxF, RxR, and RxP respectively correspond to the transition signals TxF9, TxR9, and TxP9 in the transmission device 10, and each indicate symbol transition. The signal generator 46 specifies symbol transition (see FIG. 3), based on a symbol indicated by the output signals of the flip-flop 44 and a symbol indicated by the output signals of the flip-flop 45, and generates the transition signals RxF, RxR, and RxP.

The processor 32 (see FIG. 1) is adapted to perform predetermined processing, based on the transition signals RxF, RxR, and RxP and the clock signal RxCK. The processor 32 may include a data comparator 39. The data comparator 39 is adapted to compare the transition signals RxF, RxR, and RxP with data (transition signals) having a predetermined data pattern in a calibration mode to generate the comparison result information INF. The data corresponds to data for calibration generated by the data generator 19.

The transmitter 33 is adapted to generate the control signal CTL, based on the comparison result information INF and transmit the control signal CTL to the transmission device 10.

(Transmission Path 100)

FIG. 12 illustrates a configuration example of the transmission path 100. The transmission path 100 is configured of a so-called stripline. The transmission path 100 may include a conductive layer 101, a dielectric layer 102, and a conductive layer 103, in addition to the lines 110A to 110C.

The conductive layers 101 and 103 each may be made of a metal, for example. The conductive layers 101 and 103 are grounded in this example. The dielectric layer 102 is made of a dielectric. A relative dielectric constant Er of the dielectric layer 102 is "4.3" in this example. In the transmission path 100, the conductive layer 101, the dielectric layer 102, and the conductive layer 103 are stacked in this order.

The lines 110A, 110B, and 110C are disposed at a distance d1 from the conductive layer 101 and a distance d2 from the conductive layer 103 in the dielectric layer 102, The distance d1 is 0.065 [mm] in this example, and the distance d2 is 0.1 [mm] in this example. The lines 110A, 110B, and 110C are respectively formed with widths WA, WB, and WC, and are disposed side by side in this order at intervals P. The widths WA, WB, and WC each are 0.05 [mm] in this example, and the intervals P are 0.075 [mm] in this example.

Here, the transmitter 20 and the controller 15 correspond to specific but non-limiting examples of a "transmitter" of a first transmission device in an embodiment of the disclosure. The output terminal ToutA corresponds to a specific but non-limiting example of a "first output terminal" in an embodiment of the disclosure. The output terminal ToutB corresponds to a specific but non-limiting example of a "second output terminal" in an embodiment of the disclosure. The output terminal ToutC corresponds to a specific but non-limiting example of a "third output terminal" in an embodiment of the disclosure.

Operation and Workings

Next, description is given of operation and workings of the communication system 1 according to the embodiment.

(General Operation Outline)

First, a general operation outline of the communication system 1 is described with reference to FIG. 1. The clock generator 11 of the transmission device 10 generates the clock signal TxCK. The processor 12 performs the predetermined processing to generate the transition signals TxF0 to TxF6, TxR0 to TxR6, and TxP0 to TxP6. The data generator 19 of the processor 12 generates the data for calibration (the transition signals) having the predetermined data pattern in the calibration mode. The receiver 14 receives the control signal CTL supplied from the reception device 30 and supplies the controller 15 with the comparison result information INF included in the control signal CTL. The controller 15 generates the control signal Sctl1 and Sctl2, based on the comparison result information INF. The transmitter 20 generates the signal SIGA, SIGB, and SIGC, based on the transition signals TxF0 to TxF6, TxR0 to TxR6, and TxP0 to TxP6, and sets the output impedances Zoa, Zob, and Zoc, based on the control signals Sctl1 and Sctl2. The transmission path 100 carries the signals SIGA, SIGB, and SIGC.

The receiver 40 of the reception device 30 receives the signal SIGA, SIGB, and SIGC, and generates the transition signal RxF, RxR, and RxP and the clock signal RxCK, based on the signals SIGA, SIGB, and SIGC. The processor 32 performs the predetermined processing, based on the transition signals RxF, RxR, and RxP and the clock signal RACK. The data comparator 39 of the processor 32 compares the transition signal RxF, RxR, and RxP with the data (the transition signals) having the predetermined data pattern in the calibration mode to generate the comparison result information INF. The transmitter 33 generates the control signal CTL, based on the comparison result information INF, and transmits the control signal CTL to the transmission device 10.

(Adjustment of Output Impedance)

The communication system 1 operates in the calibration mode upon power-up, and adjusts the output impedances Zoa, Zob, and Zoc of the transmission device 10. In the following, description is given in detail of this operation.

FIG. 13 illustrates an operation example of the communication system 1 in the calibration mode. The transmission device 10 generates the signal SIGA, SIGB, and SIGC, based on the data for calibration, and transmits the signals SIGA, SIGB, and SIGC while sequentially varying the output impedances Zoa, Zob, and Zoc. Further, the reception device 30 receives the signals SIGA, SIGB, and SIGC. The transmission device 10 determines the output impedance Zoa, Zob, and Zoc, based on a reception result in the reception device 30. In the following, description is given in detail of this operation.

First, the controller 15 of the transmission device 10 sets each of the codes Czac and Czb to an initial value (step S1). This causes the output impedances Zoa, Zob, and Zoc of the driver section 29A, 29B, and 29C each to be set to about 50 [Ω].

Thereafter, the controller 15 decrements the code Czb, and increments the code Czac (step S2). This causes the output impedance Zob of the driver section 29B to be set to a value that is lower by one stage, and causes the output impedances Zoa and Zoc of the driver sections 29A and 29C to be set to a value that is higher by one stage.

Then, the controller 15 determines whether a communication error has occurred (step S3). More specifically, first, in the transmission device 10, the data generator 19 of the processor 12 generates the data for calibration (the transition signals), and the transmitter 20 generates the signals SIGA, SIGB, and SIGC, based on the data, and transmits the signals SIGA, SIGB, and SIGC. In the reception device 30, the receiver 40 receives the signals SIGA, SIGB, and SIGC, and generates the transition signals RxF, RxR, and RxP. The data comparator 39 of the processor 32 compares the transition signals RxF, RxR, and RxP with predetermined data (the data for calibration) to generate the comparison result information INF. The data comparator 39 then supplies the controller 15 of the transmission device 10 with the comparison result information. INF through the transmitter 33 and the receiver 14. Then, the controller 15 determines whether the communication error has occurred, based on the comparison result information INF.

The data for calibration may preferably have a data pattern that easily causes a communication error, for example. More specifically, the data for calibration may include a data pattern that easily causes so-called inter-symbol interface (ISI) jitter, for example. Moreover, for example, the data for calibration may include many data patterns including a data pattern in which one of the differences DAB, DBC, and DCA is varied from +2ΔV to −ΔV and a data pattern in which one of the differences DAB, DBC, and DCA is varied from −2ΔV to +ΔV, as illustrated in FIG. 10.

In a case in which the communication error has not occurred in the step S3 ("N" in the step S3), the operation by the communication system 1 returns to the step S2. The steps S2 and S3 are repeated until the communication error occurs.

In a case in which the communication error has occurred in the step S3 ("Y" in the step S3), the controller 15 respectively sets the codes Czb and Czac to a code Czb1 and a code Czac1 (step S4).

Thereafter, the controller 15 sets each of the codes Czac and Czb to the initial value (step S5). This causes each of the output impedances Zoa, Zob, and Zoc of the driver sections 29A, 29B, and 29C to be set to about 50 [Ω] again.

Next, the controller 15 increments the code Czb, and decrements the code Czac (step S6). This causes the output impedance Zob of the driver section 29B to be set to a value that is higher by one stage, and causes each of the output impedances Zoa and Zoc of the driver sections 29A and 29C to be set to a value that is lower by one stage.

Thereafter, the controller 15 determines whether the communication error has occurred (step S7). A specific operation in this step is similar to the operation in the step S3. In a case in which the communication error has not occurred in the step S7 ("N" in the step S7), the operation by the communication system 1 returns to the step S6. The steps S6 and S7 are repeated until the communication error occurs.

In a case in which the communication error has occurred in the step S7 ("Y" in the step S7), the controller 15 respectively sets the codes Czb and Czac to a code Czb2 and a code Czac2 (step S8).

Next, the controller 15 sets the code Czb to an average value of the code Czb1 and the code Czb2, and sets the code Czac to an average value of the code Czac1 and the code Czac2 (step S9). This causes the output impedance Zoa of the driver section 29A, the output impedance Zob of the driver section 29B, and the output impedance Zoc of the driver section 29C to be respectively set to a value corresponding to the code Czac, a value corresponding to the code Czb, and a value corresponding to the code Czac.

This flow is ended in this way. By this flow, the output impedances Zoa, Zob, and Zoc are so set as to widen an eye opening of a differential signal.

When the output impedances Zoa, Zob, and Zoc of the driver sections 29A, 29B, and 29C are set in this way, the output impedance Zob of the driver section 29B becomes lower than the impedances Zoa and Zoc of the driver sections 29A and 29C. In other words, first, in the transmission path 100, the lines 110A, 110B, and 110C are disposed in this order as illustrated in FIG. 12. Accordingly, a difference between a differential impedance of the lines 110A and 110C and a differential impedance of the lines 110A and 110B is increased, and a difference between the differential impedance of the lines 110A and 110C and a differential impedance of the lines 110B and 110C is increased. As described above, in the transmission path 100, the differential impedances are asymmetric, which may cause narrowing of the eye opening of the differential signal. In the flow illustrated in FIG. 13, the output impedances Zoa, Zob, and Zoc of the driver sections 29A, 29B, and 29C are so adjusted as to compensate for asymmetry of the differential impedances. As a result, the output impedance Zob of the driver section 29B is set to a lower value than the values of the output impedances Zoa and Zoc of the driver sections 29A and 29C as will be described below.

FIG. 14 illustrates simulation results of the eye opening of the differential signal. This example shows eye openings (voltage values) when different data patterns DP1 to DP10 were used in four cases C1 to C4. It is to be noted that in the simulation, in order to obtain a so-called worst condition for the eye openings, general resistance was set to a large value. In the case C1, the output impedances Zoa, Zob, and Zoc of the driver sections 29A, 29B, and 29C were 60 [Ω]. In the case C2, the output impedance Zoa of the driver section 29A was 54 [Ω], and the output impedances Zob and Zoc of the driver sections 29B and 29C were 60 [Ω]. In the case C3, the output impedances Zoa and Zoc of the driver sections 29A and 29C were 60 [Ω], and the output impedance Zob of the driver section 29B was 54 [Ω]. In the case C4, the output impedances Zoa and Zob of the driver sections 29A and 29B were 60 [Ω], and the output impedance Zoc of the driver section 29C was 54 [Ω].

As illustrated in FIG. 14, the eye opening in the case C3 is larger than the eye openings in the cases C1, C2, and C4. In other words, in a case in which the output impedance Zob of the driver section 29B is lower than the output impedances Zoa and Zoc of the driver sections 29A and 29C, asymmetry of the differential impedances in the transmission path 100 is compensated, thereby widening the eye opening of the differential signal.

As described above, in the communication system 1, the output impedance Zob of the driver section 29B is lower than the output impedances Zoa and Zoc of the driver sections 29A and 29C. This makes it possible to compensate for asymmetry of the differential impedances in the transmission path 100, thereby widening the eye opening. Accordingly, in the communication system 1, it is possible to reduce communication errors and improve communication performance.

Effects

As described above, in the embodiment, the output impedance Zob is lower than the output impedances Zoa and Zoc, which makes it possible to improve communication performance.

In the embodiment, the output impedances are adjusted, based on the reception result in the reception device. This makes it possible to set each of the values of the output impedances to a more desirable value, thereby improving communication performance.

Modification Example 1-1

In the foregoing embodiment, the output impedances Zoa, Zob, and Zoc are varied as illustrated in FIG. 13, but the foregoing embodiment is not limited thereto. Alternatively, for example, only the output impedance Zob may be varied as illustrated in FIG. 15.

In this example, first, the controller 15 sets each of the codes Czac and Czb to the initial value (step S1). Thereafter, the controller 15 decrements the code Czb (step S12). This causes the output impedance Zob of the driver section 29B to be set to a value that is lower by one stage. In other words, unlike the foregoing embodiment, the output impedances Zoa and Zoc of the driver sections 29A and 29C are not varied, whereas only the output impedance Zob of the driver section 29B is varied. Thereafter, the controller 15 determines whether the communication error has occurred (step S3). In a case in which the communication error has not occurred in the step S3 ("N" in the step S3), the operation by the communication system 1 returns to the step S2. In a case in which the communication error has occurred in the step S3 ("Y" in the step S3), the controller 15 sets the code Czb to the code Czb1 (step S14).

Next, the controller 15 sets the code Czb to the initial value (step S15). The controller 15 then increments the code Czb (step S16). This causes the output impedance Zob of the driver section 29B to be set to a value that is higher by one stage. In other words, unlike the foregoing embodiment, the output impedances Zoa and Zoc of the driver sections 29A and 29C are not varied, whereas only the output impedance Zob of the driver section 29B is varied. Thereafter, the controller 15 determines whether the communication error has occurred (step S7). In a case in which the communication error has not occurred in the step S7 ("N" in the step S7), the operation by the communication system 1 returns to the step S16. In a case in which the communication error has occurred in the step S7 ("Y" in the step S7), the controller 15 sets the code Czb to the code Czb2 (step S18).

Next, the controller 15 sets the code Czb to the average value of the code Czb1 and the code Czb2 (step S19). This causes the output impedance Zob of the driver section 29B to be set to a value corresponding to the code Czb.

Modification Example 1-2

In the foregoing embodiment, the output impedances are adjusted in the calibration mode, based on the reception result in the reception device, but the embodiment is not limited thereto. Alternatively, for example, the output impedances Zoa, Zob, and Zoc of the driver sections 29A, 29B, and 29C may be fixed. Even in this case, the output impedance Zob of the driver section 29B is lower than the output impedances Zoa and Zoc of the driver sections 29A and 29C, which makes it possible to improve communication performance.

2. Second Embodiment

In the following, description is given of a communication system 1B according to a second embodiment. In the second embodiment, a method of adjusting the output impedances is different from that in the foregoing first embodiment. More specifically, in the foregoing first embodiment, the sequence of the symbols is transmitted, and the output impedances are adjusted, based on whether the communication error occurs. In contrast, in the second embodiment, the voltages of the signals SIGA, SIGB, and SIGC are set, and the output impedances are adjusted, based on whether signals SAB, SBC, and SCA in the reception device each are equal to an expected value. It is to be noted that substantially same components as the components of the communication system 1 according to the foregoing first embodiment are denoted by same reference numerals, and any redundant description thereof is omitted.

FIG. 16 illustrates a configuration example of the communication system 1B. The communication system 1B may include a transmission device 10B and a reception device 30B.

The transmission device 10B may include a processor 12B, a transmitter 20B, a receiver 14B, and a controller 15B.

The processor 12B is adapted to perform predetermined processing to generate the transition signals TxF0 to TxF6, TxR0 to TxR6, and TxP0 to TxP6. The processor 12B is similar to the processor 12 according to the foregoing first embodiment, except that the data generator 19 is not included.

The transmitter 20B is adapted to generate the signals SIGA, SIGB, and SIBC, based on the transition signals TxF0 to TxF6, TxR0 to TxR6, and TxP0 to TxP6. The transmitter 20B has a function of setting the voltages of the signals SIGA, SIGB, and SIGC, based on a control signal Smode and setting the output impedances Zoa, Zob, and Zoc, based on the control signals Sctl1 and Sctl2 in the calibration mode. The transmitter 20B may include an output section 27B, as with the transmitter 20 (see FIG. 4) according to the first embodiment.

FIG. 17 illustrates a configuration example of the output section 27B. The output section 27B may include a driver controller 88 and impedance adjusters 88A, 88B, and 88C.

The driver controller 88 is adapted to generate control signals UP1A, UP2A, DN1A, DN2A, UP1B, UP2B, DN1B, DN2B, UP1C, UP2C, DN1C, and DN2C, based on the symbol signals Tx1, Tx2, and Tx3, the control signal Smode, and the clock signal TxCK. At this occasion, the driver controller 88 sets the voltages of the signals SIGA, SIGB, and SIGC in the calibration mode, based on the control signal Smode.

FIG. 18 illustrates a relationship between the control signal Smode and the voltages of the signals SIGA, SIGB, and SIGC. In a case in which the control signal Smode indicates a mode M1, the driver controller 88 sets the voltages of the signals SIGA and SIGB to the high-level voltage VH, and sets the voltage of the signal SIGC to the low-level voltage VL. Moreover, in a case in which the control signal Smode indicates a mode M2, the driver controller 88 sets the voltage of the signal SIGA to the low-level voltage VL, and sets the voltages of the signals SIGB and SIGC to the high-level voltage VH. Further, in a case in which the control signal Smode indicates a mode M3, the driver controller 88 sets the voltages of the signals SIGA and SIGB to the low-level voltage VL, and sets the voltage of the signal SIGC to the high-level voltage VH. Furthermore, in a case in which the control signal Smode indicates a mode M4, the driver controller 88 sets the voltage of the signal SIGA to the high-level voltage VH, and sets the voltages of the signals SIGB and SIGC to the low-level voltage VL.

As will be described later, in the communication system 1B, the output impedance Zob is set to be lower than the output impedances Zoa and Zoc, as with the communication system 1 according to the first embodiment. Accordingly, for example, even when the voltages of the signals SIGA and SIGB are set to the high-level voltage VH in the mode M1 as illustrated in FIG. 18, the actual voltages of the signals SIGA and SIGB are not equal to each other. In other words, when the output impedance Zob is set to be lower than the output impedance Zoa, the voltage of the signal SIGB becomes higher than the voltage of the signal SIGA. Accordingly, in the mode M1, the expected value of the signal SAB is "0" (SAB=0) as illustrated in FIG. 18. Likewise, when the output impedance Zob is set to be lower than the output impedance Zoc in the mode M2, the voltage of the signal SIGB becomes higher than the voltage of the signal SIGC. Accordingly, in the mode M2, the expected value of the signal SBC is "1" (SBC=1). When the output impedance Zob is set to be lower than the output impedance Zoa in the mode M3, the voltage of the signal SIGB becomes higher than the voltage of the signal SIGA. Accordingly, in the mode M3, the expected value of the signal SAB is "1" (SAB=1). When the output impedance Zob is set to be lower than the output impedance Zoc in the mode M4, the voltage of the signal SIGB becomes lower than the voltage of the signal SIGC. Accordingly, the expected value of the signal SBC is "0" (SBC=0).

The impedance adjusters 88A, 88B, and 88C are adapted to adjust the output impedances Zoa, Zob, and Zoc of the driver sections 29A, 29B, and 29C, as with the impedance adjusters 28A, 28B, and 28C according to the first embodiment. At this occasion, the impedance adjusters 88A, 88B, and 88C are able to separately adjust the output impedances Zoa, Zob, and Zoc when the driver sections 29A, 29B, and 29C output the high-level voltage VH and the output impedances Zoa, Zob, and Zoc when the driver sections 29A, 29B, and 29C output the low-level voltage VL.

FIG. 19 illustrates a configuration example of the impedance adjuster 88A. The impedance adjuster 88A may include an impedance controller 889A and AND circuit sections 881A to 887A.

The impedance controller 889A is adapted to generate control signals SELU1 to SELU7 and control signals SELD1 to SELD7, based on the control signal Sctl1.

The AND circuit section 881A is adapted to generate the control signals PU11A, PU12A, PD11A, and PD12A, based on the control signals UP1A, UP2A, DN1A, and DN2A and the control signals SELU1 and SELD1. The first input terminal and the second input terminal of the AND circuit 2811A are respectively supplied with the control signal UP1A and the control signal SELU1, and the output terminal of the AND circuit 2811A outputs the control signal PU11A. The first input terminal and second input terminal of the AND circuit 2812A are respectively supplied with the control signal UP2A and the control signal SELU1, and the output terminal of the AND circuit 2812A outputs the control signal PU12A. The first input terminal and the second input terminal of the AND circuit 2813A are respectively supplied with the control signal DN1A and the control signal SELD1, and the output terminal of the AND circuit 2813A outputs the control signal PD11A. The first input terminal and the second input terminal of the AND circuit 2814A are respectively supplied with the control signal DN2A and the control signal SELD1, and the output terminal of the AND circuit 2814A outputs the control signal PD12A.

Likewise, the AND circuit section 882A is adapted to generate the control signals PU21A, PU22A, PD21A, and PD22A, based on the control signals UP1A, UP2A, DN1A, and DN2A and the control signals SELU2 and SELD2. The AND circuit section 883A is adapted to generate the control signals PU31A, PU32A, PD31A, and PD32A, based on the control signals UP1A, UP2A, DN1A, and DN2A and the control signals SELU3 and SELD3. The AND circuit section 884A is adapted to generate the control signals PU41A, PU42A, PD41A, and PD42A, based on the control signals UP1A, UP2A, DN1A, and DN2A and the control signals SELU4 and SELD4. The AND circuit section 885A is adapted to generate the control signals PU51A, PU52A, PD51A, and PD52A, based on the control signals UP1A, UP2A, DN1A, and DN2A, and the control signals SELU5 and SELD5. The AND circuit section 886A is adapted to generate the control signals PU661A, PU62A, PD61A, and PD62A, based on the control signals UP1A, UP2A, DN1A, and DN2A and the control signals SELU6 and SELD6. The AND circuit section 887A is adapted to generate the control signals PU71A, PU72A, PD71A, and PD72A, based on the control signal UP1A, UP2A, DN1A, and DN2A and the control signals SELU7 and SELD7.

It is to be noted that description is given here of the impedance adjuster 88A as an example, and the same description applies to the impedance adjusters 88B and 88C. The impedance adjuster 88B may include an impedance controller 889B and AND circuit sections 881B to 887B. The impedance adjuster 88C may include an impedance controller 889C and AND circuit sections 881C to 887C. The impedance controller 889B is adapted to generate the control signals SELU1 to SELU7 and the control signals SELD1 to SELD7 to be used in the impedance adjuster 88B, based on the control signal Sctl2. The impedance controller 889C is adapted to generate the control signals SELU1 to SELU7 and the control signals SELD1 to SELD7 to be used in the impedance adjuster 88C, based on the control signal Sctl1. The AND circuit sections 881B to 887B and 881C to 887C have similar functions as the functions of the AND circuit sections 881A to 887A.

The receiver 14B is adapted to receive the control signal CTL supplied from the reception device 30B and supply the controller 15B with the signals SAB, SBC, and SCA included in the control signal CTL.

The controller 15B is adapted to set the voltages of the signal SIGA, SIGB, and SIGC by means of the control signal Smode and set the output impedances Zoa, Zob, and Zoc of the driver sections 29A, 29B, and 29C by means of the control signals Sctl1 and Sctl2, based on the signals SAB, SBC, and SCA. The control signal Sctl1 may include codes Czacup and Czacdn. The code Czacup indicates the output impedances Zoa and Zoc when the driver sections 29A and 29C output the high-level voltage VH. The output impedances Zoa and Zoc are decreased with a decrease in a value of the code Czacup, whereas the output impedances Zoa and Zoc are increased with an increase in the value of the code Czacup. The code Czacdn indicates the output impedances Zoa and Zoc when the driver sections 29A and 29C output the low-level voltage VL. The output impedances Zoa and Zoc are decreased with a decrease in a value of the code Czacdn, whereas the output impedances Zoa and Zoc are increased with an increase in the value of the code Czacdn. Moreover, the control signal Sctl2 may include codes Czbup and. Czbdn. The code Czbup indicates the output impedance Zob when the driver section 29B outputs the high-level voltage VH. The output impedance Zob is decreased with a decrease in a value of the code Czbup, whereas the output impedance Zob is increased with an increase in the value of the code Czbup. The code Czbdn indicates the output impedance Zob when the driver section 29B outputs the low-level voltage VL. The output impedance Zob is decreased with a decrease in a value of the code Czbdn, whereas the output impedance Zob is increased with an increase in the value of the code Czbdn.

The reception device 30B may include a receiver 40B, a processor 32B, and a transmitter 33B. The receiver 40B is adapted to receive the signal SIGA, SIGB, and SIGC and generate the transition signals RxF, RxR, and RxP and the clock signal RxCK, based on the signals SIGA, SIGB, and SIGC. Moreover, the receiver 40B also has a function of outputting the signals SAB, SBC, and SCA. The processor 32B is adapted to perform predetermined processing, based on the transition signals RxF, RxR, and RxP and the clock signal RxCK. The processor 32B is similar to the processor 32 according to the foregoing first embodiment, except that the data comparator 39 is not included. The transmitter 33B is adapted to generate the control signal CTL, based on the signals SAB, SBC, and SCA and transmit the control signal CTL to the transmission device 10B.

Here, the transmitter 20B and the controller 15B correspond to specific but non-limiting examples of a "transmitter" of a first transmission device in an embodiment of the disclosure.

FIG. 20 illustrates an operation example of the communication system 1B in the calibration mode.

First, the controller 15B of the transmission device 10B sets each of the codes Czacup, Czacdn, Czbup, and Czbdn to an initial value (step S21). This causes the output impedances Zoa, Zob, and Zoc of the driver sections 29A, 29B, and 29C each to be set to about 50 [Ω].

Next, the controller 15B sets an operation mode to the mode M1 (step S22). More specifically, the controller 15B supplies the driver controller 88 with the control signal Smode to set the voltages of the signals SIGA and SIGB to the high-level voltage VH and set the voltage of the signal SIGC to the low-level voltage VL. The receiver 40B of the reception device 30B then receives the signals SIGA, SIGB, and SIGC, and supplies the controller 15B of the transmission device 10B with the signals SAB, SBC, and SCA through the transmitter 33B and the receiver 14B.

Thereafter, the controller 15B determines whether the signal SAB is "0" (step S23). In a case in which the signal SAB is not "0" in the step S23 ("N" in the step S23), the controller 15B decrements the code Czbup (step S24), and the operation by the communication system 1B returns to the step S23. The steps S23 and S24 are repeated until the signal SAB becomes "0". Thus, the output impedance Zob when the driver section 29B outputs the high-level voltage VH becomes lower than the output impedance Zoa when the driver section 29A outputs the high-level voltage VH.

Moreover, in a case in which the signal SAB is "0" in the step S23 ("Y" in the step S23), the controller 15B sets the operation mode to the mode M2 (step S25). More specifically, the controller 15B sets the voltage of the signal SIGA to the low-level voltage VL, and sets the voltages of the signals SIGB and SIGC to the high-level voltage VH. The receiver 40B of the reception device 30B then receives the signals SIGA, SIGB, and SIGC, and supplies the controller 15B of the transmission device 10B with the signals SAB, SBC, and SCA through the transmitter 33B and the receiver 14B.

Next, the controller 15B determines whether the signal SBC is "1" (step S26). In a case in which the signal SBC is not "1" in the step S26 ("N" in the step S26), the controller 15B decrements the code Czbup (step S27), and the operation by the communication system 1B returns to the step S26. The steps S26 and S27 are repeated until the signal SBC becomes "1". Thus, the output impedance Zob when the driver section 29B outputs the high-level voltage VH becomes lower than the output impedance Zoc when the driver section 29C outputs the high-level voltage VH.

Further, in a case in which the signal SBC is "1" in the step S26 ("Y" in the step S26), the controller 15B sets the operation mode to the mode M3 (step S28). More specifically, the controller 15B sets the voltages of the signals SIGA and SIGB to the low-level voltage VL, and sets the voltage of the signal SIGC to the high-level voltage VH. The receiver 40B of the reception device 30B then receives the signals SIGA, SIGB, and SIGC, and supplies the controller 15B of the transmission device 10B with the signals SAB, SBC, and SCA through the transmitter 33B and the receiver 14B.

Next, the controller 15B determines whether the signal SAB is "1" (step S29). In a case in which the signal SAB is not "1" in the step S29 ("N" in the step S29), the controller 15B decrements the code Czbdn (step S30), and the operation by the communication system 1B returns to the step S29. The steps S20 and S30 are repeated until the signal SAB becomes "1". Thus, the output impedance Zob when the driver section 29B outputs the low-level voltage VL becomes lower than the output impedance Loa when the driver section 29A outputs the low-level voltage VL.

Further, in a case in which the signal SAB is "1" in the step S29 ("Y" in the step S29), the controller 15B sets the operation mode to the mode M4 (step S31). More specifically, the controller 15B sets the voltage of the signal SIGA to the high-level voltage VH, and sets the voltages of the signals SIGB and SIGC to the low-level voltage VL. The receiver 40B of the reception device 30B then receives the signals SIGA, SIGB, and SIGC, and supplies the controller 15B of the transmission device 10B with the signals SAB, SBC, and SCA through the transmitter 33B and the receiver 14B.

Next, the controller 15B determines whether the signal SBC is "0" (step S32). In a case in which the signal SBC is not "0" in the step S32 ("N" in the step S32), the controller 151B decrements the code Czbdn (step S33), and the operation by the communication system 1B returns to the step S32. The steps S32 and S33 are repeated until the signal SBC becomes "0". Thus, the output impedance Zob when the driver section 29B outputs the low-level voltage VL becomes lower than the output impedance Zoc when the driver section 29C outputs the low-level voltage VL.

In a case in which the signal SBC is "0" ("Y" in the step S3), this flow is ended.

Thus, in the communication system 1B, the transmission device 10B sets the voltages of the signals SIGA, SIGB, and SIGC, and adjusts the output impedance, based on whether the signals SAB, SBC, and SCA in the reception deice 30B each are equal to the expected value. Accordingly, unlike the communication system 1 according to the foregoing first embodiment, the communication system 1B does not transmit and receive the sequence of the symbols. This makes it possible to reduce calibration time.

As described above, in the embodiment, the transmission device sets the voltages of the signals SIGA, SIGB, and SIGC, and adjusts the output impedance, based on the whether the signals SAB, SBC, and SCA each are equal to the expected value, which makes it possible to reduce the calibration time. Other effects are similar to those in the foregoing first embodiment.

Modification Example 2-1

In the foregoing embodiment, for example, in the case in which the signal SAB is "0" in the step S23 ("Y" in the step S23), the operation by the communication system 1B proceeds to the step S25 as illustrated in FIG. 20, but the foregoing embodiment is not limited thereto. For example, in the case in which the signal SAB is "0", the code Czbup may be decreased by a predetermined amount, and then the operation by the communication system 1B may proceed to the step S25. This makes it possible to secure a margin of the code Czbup.

Likewise, in the foregoing embodiment, for example, in the case in which the signal SBC is "1" in the step S26 ("Y" in the step S26), the operation by the communication system 1B proceeds to the step S28, but the embodiment is not limited thereto. For example, in the case in which the signal SBC is "1", the code Czbup may be decreased by a predetermined amount, and then the operation by the communication system 1B may proceed to the step S28. This makes it possible to secure a margin of the code Czbup.

Likewise, in the foregoing embodiment, for example, in the case in which the signal SAB is "1" in the step S29 ("Y" in the step S29), the operation by the communication system 1B proceeds to the step S31, but the embodiment is not limited thereto. For example, in the case in which the signal SAB is "1", the code Czbdn may be decreased by a predetermined amount, and then the operation by the communication system 1B may proceed to the step S31. This makes it possible to secure a margin of the code Czbdn.

Likewise, in the foregoing embodiment, for example in the case in which the signal SBC is "0" in the step S32 ("Y" in the step S32), the flow is ended, but the embodiment is not limited thereto. For example, in the case in which the signal SBC is "0", the code Czbdn may be decreased by a predetermined amount, and then the flow may be ended. This makes it possible to secure the margin of the code Czbdn.

Modification Example 2-2

In the foregoing embodiment, only the output impedance Zob is varied as illustrated in FIG. 20, but the embodiment is not limited thereto. Alternatively, for example, the output impedances Zoa and Zoc may be also varied as illustrated in FIG. 21.

In this example, in the case in which the signal SAB is not "0" in the step S23 ("N" in the step S23), the controller 15B may decrement the code Czbup, and may increment the code Czacup (step S34).

Likewise, in the case in which the signal SBC is not "1" in the step S26 ("N" in the step S26), the controller 15B may decrement the code Czbup, and may increment the code Czacup (step S35).

Likewise, in the case in which the signal SAB is not "1" in the step S29 ("N" in the step S29), the controller 15B may decrement the code Czbdn, and may increment the code Czacdn (step S36).

Likewise, in the case in which the signal SBC is not "0" in the step S32 ("N" in the step S32), the controller 15B may decrement the code Czbdn and may increment the code Czacdn (step S37).

Modification Example 2-3

In the foregoing embodiment, the operation mode is set in order of the modes M1, M2, M3, and M4 to adjust the output impedance, but the order of the modes is not limited thereto. Alternatively, for example, the operation mode may be set in order of the modes M3, M4, M1, and M2. Moreover, the order of the modes M1 and M2 may be interchanged, or the order of the modes M3 and M4 may be interchanged.

3. Third Embodiment

In the following, description is given of a communication system 2 according to a third embodiment in the third embodiment, amplitudes of the signals SIGA, SIGB, and SIBC are adjusted instead of the output impedances. It is to be noted that substantially same components as the components of the communication system 1 according to the foregoing first embodiment and other communication systems described above are denoted by same reference numerals, and any redundant description thereof is omitted.

FIG. 22 illustrates a configuration example of the communication system 2. The communication system 2 may include a transmission device 50. The transmission device 50 may include a transmitter 60, a controller 55, and a regulator 56.

The transmitter 60 is adapted to generate the signals SIGA, SIGB, and SIGC, based on the transition signals TxF0 to TxF6, TxR0 to TxR6, and TxP0 to TxP6. The transmitter 60 is supplied with two voltages Vreg1 and Vreg2 generated by the regulator 56. The transmitter 60 may include an output section 67, as with the transmitter 20 (see FIG. 4) according to the first embodiment.

FIG. 23 illustrates a configuration example of the output section 67. The output section 67 may include a setting section 69. The setting section 69 is adapted to generate the control signal Sctl and supply the impedance adjusters 28A to 28C with the control signal Sctl. In this example, the driver section 29A and the driver section 29C are supplied with the voltage Vreg1. More specifically, the drains of the transistors 91 and 95 (see FIG. 8) of seven drivers 291A to 297A of the driver section 29A and the drains of the transistors 91 and 95 of seven drivers 291C to 297C of the driver section 29C are supplied with the voltage Vreg1. Moreover, the driver section 29B is supplied with the voltage Vreg2. More specifically, the drains of the transistors 91 and 95 (see FIG. 8) of seven drivers 291B to 297B of the driver section 29B are supplied with the voltage Vreg2. This makes it possible to make an amplitude Vswb of the signal SIGB generated by the driver section 29B different from amplitudes Vswa and Vswc of the signals SIGA and SIGC generated by the driver sections 29A and 29C in the transmission device 50.

The controller 55 is adapted to supply the regulator 56 with a control signal, based on the comparison result information INF. The control signal may include codes Cvac and Cvb. The code Cvac indicates a voltage value of the voltage Vreg1. The voltage Vreg1 is decreased with a decrease in a value of the code Cvac, whereas the voltage Vreg1 is increased with an increase in the value of the code Cvac. The code Cvb indicates a voltage value of the voltage Vreg2. The voltage Vreg2 is decreased with a decrease in a value of the code Cvb, whereas the voltage Vreg2 is increased with an increase in the value of the code Cvb.

The regulator 56 is adapted to generate the voltages Vreg1 and Vreg2, based on the control signal supplied from the controller 55.

Here, the transmitter 60, the controller 55, and the regulator 56 correspond to specific but non-limiting example of a "transmitter" of a second transmission device in an embodiment of the disclosure.

FIG. 24 illustrates an operation example of the communication system 2 in the calibration mode.

First, the controller 55 of the transmission device 50 sets each of the codes Cvac and Cvb to an initial value (step S41). This may cause the amplitudes Vswa, Vswb, and Vswc of the signals SIGA, SIGB, and SIGC each to be set to about 0.45 V, for example.

Next, the controller 55 decrements the code Cvb (step S42). This causes the amplitude Vswb of the signal SIGB to be set to a value that is smaller by one stage.

Thereafter, the controller 55 determines whether the communication error has occurred (step S43). More specifically, first, in the transmission device 50, the data generator 19 of the processor 12 generates the data for calibration (the transition signals), and the transmitter 60 generates the signals SEGA, SIGB, and SIGC, based on the data, and transmits the signal SIGA, SIGB, and SIGC. In the reception device 30, the receiver 40 receives the signals SIGA, SIGB, and SIGC, and generates the transition signals RxF, RxR, and RxP. The data comparator 39 of the processor 32 compares the transition signals RxF, RxR, and RxP with predetermined data (the data for calibration) to generate the comparison result information INF. Then, the data comparator 39 supplies the controller 55 of the transmission device 50 with the comparison result information INF through the transmitter 33 and the receiver 14. Thereafter, the controller 55 determines whether the communication error has occurred, based on the comparison result information INF.

In a case in which the communication error has not occurred in the step S43 ("N" in the step S43), the operation by the communication system 2 returns to the step S42. The steps S42 and S43 are repeated until the communication error occurs.

Moreover, in a case in which the communication error has occurred in the step S43 ("Y" in the step S43), the controller 55 sets the code Cvb to a code Cvb1 (step S44).

Next, the controller 55 sets the code Cvb to an initial value (step S45). This may cause the amplitude Vswb of the signal SIGB to be set to, for example, about 0.45 V again.

Thereafter, the controller 55 increments the code Cvb (step S46). This causes the amplitude Vswb of the signal SIGB to be set to a value that is larger by one stage.

Next, the controller 55 determines whether the communication error has occurred (step S47). A specific operation in this step is similar to that in the step S43. In a case in which the communication error has not occurred in the step S47 ("N" in the step S47), the operation by the communication system 2 returns to the step S46. The steps S45 and S47 are repeated until the communication error occurs.

In a case in which the communication error has occurred in the step S47 ("Y" in the step S47), the controller 55 sets the code Cvb to a code Cvb2 (step S48).

Next, the controller 55 sets the code Cvb to an average value of the code Cvb1 and the code Cvb2 (step S49). This causes the amplitude Vswb of the signal SIGB to be set to a value corresponding to the code Cvb.

This flow is ended in this way. By this flow, the amplitude Vswb of the signal SIGB is so set as to widen an eye opening of a differential signal.

When the amplitude Vswb of the signal SIGB is set in this way, the amplitude Vswb becomes larger than the amplitudes Vswa and Vswc of the signals SIGA and SIGC. This corresponds to the case in which the output impedance Zob of the driver section 29B is lower than the output impedances Zoa and Zoc of the driver sections 29A and 29C as described in the foregoing first embodiment, other embodiments, and modification examples. In other words, in a case in which the output impedance Zob of the driver section 29B is lower than the output impedances Zoa and Zoc of the driver sections 29A and 29C, the amplitude Vswb of the signal SIGB is larger than the amplitudes Vswa and Vswc of the signals SIGA and SIGC. Accordingly, even in a case in which the output impedances Zoa, Zob, and Zoc are equal to one another, when the amplitude Vswb of the signal SIGB is larger than the amplitudes Vswa and Vswc of the signals SIGA and SIGC, the eye opening of the differential may be widened.

In the communication system 2, the amplitude Vswb of the signal SIGB is larger than the amplitudes Vswa and Vswc of the signals SIGA and SIGC. This makes it possible to widen the eye opening of the differential signal. Accordingly, in the communication system 2, it is possible to reduce communication errors and improve communication performance.

As described above, in the embodiment, the amplitude Vswb is larger than the amplitudes Vswa and Vswc, which makes it possible to improve communication performance.

In the embodiment, the amplitude is adjusted, based on the reception result in the reception device. This makes it possible to set the value of the amplitude to a more desirable value, thereby improving communication performance.

Modification Example 3-1

In the foregoing embodiment, only the amplitude Vswb of the signal SIGB is varied as illustrated in FIG. 23, but the embodiment is not limited thereto. Alternatively, the amplitudes Vswa and Vswa of the signals SIGA and SIGC may be varied as well.

Modification Example 3-2

In the foregoing embodiment, the amplitude is adjusted in the calibration mode, based on the reception result in the reception device, but the embodiment is not limited thereto. Alternatively, for example, the amplitudes Vswa, Vswb, and Vswc of the signals SIGA, SIGB, and SIGC may be fixed. Even in this case, the amplitude Vswc of the signal SIGB is larger than the amplitudes Vswa and Vswc of the signals SIGA and SIGC, which makes it possible to improve communication performance.

4. Fourth Embodiment

In the following, description is given of a communication system 3 according to a fourth embodiment. In the fourth embodiment, an input impedance of the reception device is adjusted in place of the output impedance of the transmission device. It is to be noted that substantially same components as the components of the communication system 1 according to the foregoing first embodiment and other communication systems described above are denoted by same reference numerals, and any redundant description thereof is omitted.

FIG. 25 illustrates a configuration example of the communication system 3. The communication system 3 may include a transmission device 120 and a reception device 140.

The transmission device 120 may include a transmitter 130. The transmitter 130 is adapted to generate the signals SIGA, SIGB, and SIGC, based on the transition signals TxF0 to TxF6, TxR0 to TxR6, and TxP0 to TxP6.

The reception device 140 may include a receiver 150 and a controller 141. The receiver 150 is adapted to receive the signals SIGA, SIGB, and SIGC and generate the transition signals RxF, RxR, and RxP and the clock signal RxCK, based on the signals SIGA, SIGB, and SIGC. Moreover, the receiver 150 also has a function of setting an input impedance, based on the control signals Sctl1 and Sctl2.

FIG. 26 illustrates a configuration example of the receiver 150. The receiver 150 may include variable resistors 151A, 151B, and 151C. The variable resistors 151A, 151B, and 151C each function as a terminator in the communication system 3, and respectively correspond to the resistors 41A, 41B, and 41C according to the first embodiment. The variable resistor 151A is configured to vary its resistance value, based on the control signal Sctl1. The variable resistor 151B is configured to vary its resistance value, based on the control signal Sctl2. The variable resistor 151C is configured to vary its resistance value, based on the control signal Sctl1. The resistance value of the variable resistor 151A corresponds to an input impedance Zia seen from the input terminal TinA. The resistance value of the variable resistor 151B corresponds to an input impedance Zib seen from the input terminal TinB. The resistance value of the variable resistor 151C corresponds to an input impedance Zic seen from the input terminal TinC.

The controller 141 is adapted to set the input impedances Zia, Zib, and Zic of the receiver 150. More specifically, the controller 141 generates the control signals Sctl1 and Sctl2, based on the comparison result information INF, and supplies the variable resistors 151A, 151B, and 151C of the receiver 150 with the control signals Sctl1 and Sctl2. The control signal Sctl1 may include the code Czac. The code Czac indicates the input impedances Zia and Zic of the receiver 150. The input impedances Zia and Zic are decreased with a decrease in the value of the code Czac, whereas the input impedances Zia and Zic are increased with an increase in the value of the code Czac. Moreover, the control signal Sctl2 may include the code Czb. The code Czb indicates the input impedance Zib of the receiver 150. The input impedance Zib is decreased with a decrease in the value of the code Czb, whereas the input impedance Zib is increased with an increase in the value of the code Czb.

Here, the receiver 150 and the controller 141 correspond to specific but non-limiting examples of a "receiver" of a reception device in an embodiment of the disclosure. The input terminal TinA corresponds to a specific but non-limiting example of a "first input terminal" in an embodiment of the disclosure. The input terminal TinB corresponds to a specific but non-limiting example of a "second input terminal" in an embodiment of the disclosure. The input terminal TinC corresponds to a specific but non-limiting example of a "third input terminal" in an embodiment of the disclosure.

FIG. 27 illustrates an operation example of the communication system 3 in the calibration mode.

First, the controller 141 of the reception device 140 sets each of the code Czac and Czb to an initial value (step S51). This causes the input impedances Zia, Zib, and Zic, of the receiver 150 each to be set to about 50 [Ω].

Thereafter, the controller 141 decrements the code Czb (step S52). This causes the input impedance Zib of the receiver 150 to be set to a value that is lower by one stage.

Next, the controller 141 determines whether the communication error has occurred (step S53). More specifically, first, in the transmission device 120, the data generator 19 of the processor 12 generates the data for calibration (transition signals), and the transmitter 130 generates the signals SIGA, SIGB, and SIGC, based on the data, and transmits the signals SIGA, SIGB, and SIGC. In the reception device 140, the receiver 150 receives the signals SIGA, SIGB, and SIGC, and generates the transition signals RxF, RxR, and RxP. The data comparator 39 of the processor 32 compares the transition signals RxF, RxR, and RxP with predetermined data (the data for calibration) to generate the comparison result information INF. The data comparator 39 then supplies the controller 141 with the comparison result information INF. Then, the controller 141 determines whether the communication error has occurred, based on the comparison result information INF.

In a case in which the communication error has not occurred in the step S53 ("N" in the step S53), the operation by the communication system 3 returns to the step S52. The steps S52 and S53 are repeated until the communication error occurs.

Moreover, in a case in which the communication error has occurred in the step S53 ("Y" in the step S43), the controller 141 sets the code Czb to the code Czb1 (step S54).

Thereafter, the controller 141 sets the code Czb to the initial value (step S55). This causes the input impedance Zib of the receiver 150 to be set to about 50 [Ω] again.

Next, the controller 141 increments the code Czb (step S56). This causes the input impedance Zib of the receiver 150 to be set to a value that is higher by one stage.

Thereafter, the controller 141 determines whether the communication error has occurred (step S57). A specific operation in this step is similar to that in the step S53. In a case in which the communication error has not occurred in the step S57 ("N" in the step S57), the operation by the communication system 3 returns to the step S56. The steps S56 and S57 are repeated until the communication error occurs.

In a case in which the communication error has occurred in the step S57 ("Y" in the step S57), the controller 141 sets the code Czb to the code Czb2 (step S58).

Next, the controller 15 sets the code Czb to an average value of the code Czb1 and the code Czb2 (step S59). This causes the input impedance Zib of the receiver 150 to be set to a value corresponding to the code Czb.

This flow is ended in this way. By this flow, the input impedance Zib is so set as to widen an eye opening of a differential signal.

When the input impedance Zib of the receiver 150 is set in this way, the input impedance Zib becomes higher than the input impedances Zia and Zic. In other words, in the flow illustrated in FIG. 27, the input impedance Zib of the receiver 150 is so adjusted as to compensate for asymmetry of the differential impedances in the transmission path 100. As a result, the input impedance Zib is set to a higher value than the values of the input impedances Zia and Zic.

In the communication system 3, the input impedance Zib of the receiver 150 is higher than the input impedances Zia and Zic as described above. This makes it possible to compensate for asymmetry of the differential impedances in the transmission path 100, thereby widening the eye opening. Accordingly, in the communication system 3, it is possible to reduce communication errors and improve communication performance.

As described above, in the embodiment, the input impedance Zib is higher than the input impedances Zia and Zic, which makes it possible to improve communication performance.

In the embodiment, the input impedance is adjusted, based on the reception result in the reception device. This makes it possible to set the value of the input impedance to a more desirable value, thereby improving communication performance.

Modification Example 4-1

In the foregoing embodiment, only the input impedance Zib is varied as illustrated in FIG. 27, but the embodiment is not limited thereto. The input impedances Zia and Zic may be varied as well.

Modification Example 4-2

In the foregoing embodiment, the input impedance is adjusted in the calibration mode, based on the reception result in the reception device, but the embodiment is not limited thereto. For example, the input impedances Zia, Zib, and Zic may be fixed. Even in this case, the input impedance Zib is higher than the input impedances Zia and Zic, which makes it possible to improve communication performance.

5. Fifth Embodiment

In the following, description is given of a communication system 3B according to a fifth embodiment. In the embodiment, a method of adjusting the input impedance is different from that in the foregoing fourth embodiment. More specifically, in the foregoing fourth embodiment, the sequence of symbols is transmitted, and the input impedance is adjusted, based on whether the communication error occurs. In contrast, in the embodiment, the voltages of the signals SIGA, SIGB, and SIGC are set, and the input impedance is adjusted, based on whether the signals SAB, SBC, and SCA in the reception device each are equal to an expected value. It is to be noted that substantially same components as the components of the communication system 1 according to the foregoing first embodiment and other communication systems described above are denoted by same reference numerals, and any redundant description thereof is omitted.

FIG. 28 illustrates a configuration example of the communication system 3B. The communication system 3B may include a transmission device 120B and a reception device 140B.

The transmission device 120B may include the processor 12B, a transmitter 130B, and a receiver 121B.

The processor 12B is adapted to perform predetermined processing to generate the transition signals TxF0 to TxF6, TxR0 to TxR6, and TxP0 to TxP6. The processor 12B is similar to the processor 12 according to the foregoing fourth embodiment, except that the data generator 19 is not included.

The transmitter 130E is adapted to generate the signal SIGA, SIGB, and SIGC, based on the transition signals TxF0 to TxF6, TxR0 to TxR6, and TxP0 to TxP6. The transmitter 130B also has a function of setting the voltages of the signal SIGA, SIGB, and SIGC in the calibration mode, based on the control signal Smode. The transmitter 130B may include an output section 137B.

FIG. 29 illustrates a configuration example of the output section 137B. The output section 137B may include the driver controller 88 and a setting section 69. The driver controller 88 is adapted to set the voltages of the signals SIGA, SIGB, and SIGC in the calibration mode, based on the control signal Smode, as with the second embodiment (see FIG. 17).

As will be described later, in the communication system 3B, the input impedance Zib is set to be higher than the input impedances Zia and Zic, as with the communication system 3 according to the fourth embodiment. Accordingly, for example, even when the voltages of the signals SIGA and SIGB are set to the high-level voltage VH in the mode M1 as illustrated in FIG. 18, the actual voltages of the signals SIGA and SIGB are not equal to each other. In other words, when the input impedance Zib is set to be higher than the input impedance Zia, the voltage of the signal SIGB becomes higher than the voltage of the signal SIGA. Accordingly, in the mode M1, the expected value of the signal SAB is "0" (SAB=0) as illustrated in FIG. 18. Likewise, when the input impedance Zib is set to be higher than the input impedance Zic in the mode M2, the voltage of the signal SIGB becomes higher than the voltage of the signal SIGC. Accordingly, in the mode M2, the expected value of the signal SBC is "1" (SBC=1). When the input impedance Zib is set to be higher than the input impedance Zia in the mode M3, the voltage of the signal SIGB becomes lower than the voltage of the signal SIGA. Accordingly, in the mode M3, the expected value of the signal SAB is "1" (SAB=1). When the input impedance Zib is set to be higher than input impedance Zic, in the mode M4, the voltage of the signal SIGB becomes lower than the voltage of the signal SIGC. Accordingly, the expected value of the signal SBC is "0" (SBC=0).

The receiver 121B is adapted to receive the control signal CTL supplied from the reception device 140B and supply the transmitter 130B with the control signal Smode included in the control signal CTL.

The reception device 140B may include a receiver 150B, the processor 32B, a controller 141B, and a transmitter 142B.

The receiver 150B is adapted to receive the signals SIGA, SIGB, and SIGC and generate the transition signals RxF, RxR, and RxP and the clock signal RxCK, based on the signals SIGA, SIGB, and SIGC. The receiver 150B also has a function of setting the input impedances Zia, Zib, and Zic, based on the control signals Sctl1 and Sctl2 and outputting the signals SAB, SBC, and SCA.

The processor 32B is adapted to perform predetermined processing, based on the transition signals RxF, RxR, and RxP and the clock signal RxCK. The processor 32B is similar to the processor 32 according to the foregoing fourth embodiment, except that the data comparator 39 is not included.

The controller 141E is adapted to set the voltages of the signals SIGA, SIGB, and SIGC by means of the control signal Smode and set the input impedances Zia, Zib, and Zic of the receiver 150B by means of the control signals Sctl1 and Sctl2, based on the signals SAB, SBC, and SCA.

The transmitter 142B is adapted to generate the control signal CTL, based on the control signal Smode and transmit the control signal CTL, to the transmission device 120B.

Here, the receiver 150B and the controller 141B correspond to specific but non-limiting examples of a "receiver" of a reception device in an embodiment of the disclosure.

FIG. 30 illustrates an operation example of the communication system 3B in the calibration mode.

First, the controller 141B of the reception device 140B sets each of the codes Czac and Cab to an initial value (step S21). This causes the input impedances Zia, Zib, and Zic of the receiver 150B each to be set to about 50 [Ω].

Next, the controller 141B sets the operation mode to the mode M1 (step S62). More specifically, the controller 141B supplies the driver controller 88 of the transmission device 120B with the control signal Smode through the transmitter 142B and the receiver 121B to set the voltages of the signals SIGA and SIGB to the high-level voltage VH and set the voltage of the signal SIGC to the low-level voltage VL. The receiver 150B of the reception device 140B then receives the signals SIGA, SIGB, and SIGC, and supplies the controller 141B with the signals SAB, SBC, and SCA.

Thereafter, the controller 141B determines whether the signal SAB is "0" (step S63). In a case in which the signal SAB is not "0" in the step S63 ("N" in the step S63), the controller 15B increments the code Czb (step S64), and the operation by the communication system 3B returns to the step S63. The steps S63 and S64 are repeated until the signal SAB becomes "0". Thus, the input impedance Zib becomes higher than the input impedance Zia.

Moreover, in a case in which the signal SAB is "0" in the step S63 ("Y" in the step S63), the controller 141B sets the operation mode to the mode M2. (step S65). More specifically, the controller 141B sets the voltage of the signal SIGA to the low-level voltage VL, and sets the voltages of the signals SIGB and SIGC to the high-level voltage VH. The receiver 150B of the reception device 140B then receives the signals SIGA, SIGB, and SIGC, and supplies the controller 141B with the signals SAB, SBC, and SCA.

Next, the controller 141B determines whether the signal SBC is "1" (step S66). In a case in which the signal SBC is not "1" in the step S66 ("N" in the step S66), the controller 141B increments the code Czb (step S67), and the operation by the communications system 3B returns to the step S66. The steps S66 and S67 are repeated until the signal SBC becomes "1". Thus, the input impedance Zib becomes higher than the input impedance Zic.

In a case in which the signal SBC is "1" in the step S66 ("Y" in the step S26), this flow is ended.

Thus, in the communication system 3B, the transmission device 120B sets the voltages of the signals SIGA, SIGB, and SIGC, and adjusts the input impedance, based on whether the signals SAB, SBC, and SCA in the reception device 140B each are equal to the expected value. Accordingly, unlike the communication system 3 according to the foregoing fourth embodiment, the communication system 3B does not transmit and receive the sequence of the symbols. This makes it possible to reduce calibration time.

As described above, in the embodiment, the transmission device sets the voltages of the signals SIGA, SIGB, and SIGC, and adjusts the input impedance, based on whether the signals SAB, SBC, and SCA each are equal to the expected value, which makes it possible to reduce calibration time. Other effects are similar to those in the foregoing fourth embodiment.

Modification Example 5-1

In the foregoing embodiment, only the input impedance Zib is varied as illustrated in FIG. 30, but the embodiment is not limited thereto. The input impedances Zia and Zic may be varied as well.

Modification Example 5-2

In the foregoing embodiment, the operation mode is set to the modes M1 and M2 as illustrated in FIG. 30, but the embodiment is not limited thereto. Alternatively, the operation mode may be set to the modes M3 and M4.

6. Application Examples

Next, description is given of application examples of the communication systems described in the foregoing embodiments and modification examples.

FIG. 31 illustrates an appearance of a smartphone 300 (a multi-functional mobile phone) to which the communication system according to any of the foregoing embodiments and modification examples is applied. Various devices are mounted in the smartphone 300. The communication system according to any of the foregoing embodiments and the foregoing modification examples is applied to a communication system that exchanges data between these devices.

FIG. 32 illustrates a configuration example of an application processor 310 used in the smartphone 300. The application processor 310 may include a central processing unit (CPU) 311, a memory controller 312, a power supply controller 313, an external interface 314, a graphics processing unit (GPU) 315, a media processor 316, a display controller 317, and a mobile industry processor interface (MIPI) interface 318. In this example, the CPU 311, the memory controller 312, the power supply controller 313, the external interface 314, the GPU 315, the media processor 316, and the display controller 317 are coupled to a system bus 319 to allow for data exchange through the system bus 319.

The CPU 311 is adapted to process various pieces of information handled in the smartphone 300 in accordance with a program. The memory controller 312 is adapted to control the memory 501 used when the CPU 311 performs information processing. The power supply controller 313 is adapted to control a power supply of the smartphone 300.

The external interface 314 is an interface for communication with external devices. In this example, the external interface 314 is coupled to a wireless communication section 502 and an image sensor 410. The wireless communication section 502 is adapted to carry out wireless communication with mobile phone base stations. The wireless communication section 502 may include, for example, a baseband section, a radio frequency (RF) front end section, and other components. The image sensor 410 is adapted to acquire an image, and may include, for example, a CMOS sensor.

The GPU 315 is adapted to perform image processing. The media processor 316 is adapted to process information such as voice, characters, and graphics. The display controller 317 is adapted to control the display 504 through the MIPI interface 318. The MIPI interface 318 is adapted to transmit an image signal to the display 504. As the image signal, for example, a YUV-format signal, an RGB-format signal, or any other format signal may be used. MIPI interface 318 is adapted to operate, based on a reference clock supplied from an oscillator circuit 330 including a crystal resonator. For example, the communication system according to any of the foregoing embodiments and modification examples may be applied to the communication system between the MIPI interface 318 and the display 504.

FIG. 33 illustrates a configuration example of the image sensor 410. The image sensor 410 may include a sensor 411, an image signal processor (ISP) 412, a joint photographic experts group (JPEG) encoder 413, a CPU 414, a random access memory (RAM) 415, a read only memory (ROM) 416, a power supply controller 417, an inter-integrated circuit (I²C) interface 418, and an MIPI interface 419. In this example, these blocks are coupled to a system bus 420 to allow for data exchange through the system bus 420.

The sensor 411 is adapted to acquire an image, and may be configured of, for example, a CMOS sensor. The ISP 412 is adapted to perform predetermined processing on the image acquired by the sensor 411. The JPEG encoder 413 is adapted to encode the image processed by the ISP 412 to generate a JPEG-format image. The CPU 414 is adapted to control respective blocks of the image sensor 410 in accordance with a program. The RAM 415 is a memory used when the CPU 414 performs information processing. The ROM 416 is adapted to store a program to be executed in the CPU 414, a setting value obtained by calibration, and any other information. The power supply controller 417 is adapted to control a power supply of the image sensor 410. The PC interface 418 is adapted to receive a control signal from the application processor 310. Although not illustrated, the image sensor 410 is adapted to also receive a clock signal from the application processor 310, in addition to the control signal. More specifically, the image sensor 410 is configured to be operable, based on clock signals of various frequencies. The MIPI interface 419 is adapted to transmit an image signal to the application processor 310. As the image signal, for example, a YUV-format signal, an RGB-format signal, or any other format signal may be used. The MIPI interface 419 is adapted to operate, based on a reference clock supplied from an oscillator circuit 430 including a crystal resonator, for example. For example, the communication system according to any of the foregoing embodiments and modification examples may be applied to a communication system between the MIPI interface 419 and the application processor 310.

Although the technology has been described above with reference to the example embodiments, the modification examples, and the application examples to electronic apparatuses, the technology is not limited thereto, and may be modified in a variety of ways.

For example, in the foregoing embodiments, the communication system performs calibration upon power-up, for example. However, the foregoing embodiments are not limited thereto. The communication system may perform calibration in a period in which the communication system does not transmit data. More specifically, for example, in a case in which the communication system according to any of the foregoing embodiments is applied to communication between the image sensor 410 and the application processor 310 illustrated in FIG. 33, the communication system is able to perform calibration in a period in which the image sensor 410 does not transmit image data to the application processor 310. In other words, for example, in a case in which the image sensor 410 picks up moving images, calibration may be performed in a so-called blanking period.

Moreover, for example, in the foregoing embodiments, the transmission path is configured of a stripline. However, the foregoing embodiments are not limited thereto. Alternatively, the transmission path may be configured of, for example, a microstripline as with a transmission path 800 illustrated in FIG. 34. The transmission path 800 may include a dielectric layer 802, a conductive layer 803, and lines 810A, 810B, and 810C. The dielectric layer 802 and the conductive layer 803 may be stacked. The lines 810A, 810B, and 810C may be formed on a surface of the dielectric layer 802.

Further, for example, in the foregoing embodiments and modification examples, in the case in which the voltage of the output terminal ToutA is set to the medium-level voltage VM, the control signals UP1A and DN1A are set to "1", and the control signals UP2A and DN2A are set to "0". The foregoing embodiments and modification examples are not limited thereto. Alternatively, for example, all of the control signals UP1A, UP2A, DN1A, and DN2A may be set to "0". Accordingly, in the driver section 29A, seven transistors 91, seven transistors 94, seven transistors 95, and seven transistors 98 may be turned off, and the output impedance becomes high impedance. At this occasion, the voltage of the output terminal ToutA is set to the medium-level voltage VM by the resistors 41A to 41C of the receiver.

Note that the effects described in the present specification are illustrative and non-limiting. Effects achieved by the technology may be effects other than those described above.

It is to be noted that the technology may include the following configurations.

(1) A transmission device including a transmitter including a first output, a second output, and a third output, the transmitter configured to transmit a symbol signal corresponding to a combination of signals of the first output, the second output, and the third output, wherein an output impedance of the second output is lower than an output impedance of the first output.

(2) The transmission device according to (1), wherein the first output, the second output, and the third output are disposed in this order, and the output impedance of the second output is lower than an output impedance of the third output.

(3) The transmission device according to (1) or (2), wherein the transmitter is configured to vary the output impedance of the second output.

(4) The transmission device according to (3), further including a receiver configured to receive a reception result from a reception device that receives the symbol signal, wherein the transmitter is configured to transmit the symbol signal having a predetermined sequence, and adjust the output impedance of the second output, based on the reception result.

(5) The transmission device according to (3), further including a receiver configured to receive a reception result from a reception device that receives the symbol signal, wherein the transmitter is configured to set voltages of the first output, the second output, and the third output, and adjust the output impedance of the second output, based on the reception result.

(6) The transmission device according to (5), wherein the transmitter is configured to set the voltages of the first output and the second output to a first voltage and set the voltage of the third output to a second voltage, and adjust the output impedance of the second output when the voltage of the second output is set to the first voltage, based on the reception result.

(7) The transmission device according to (1) or (2), wherein the transmitter is configured to vary the output impedance of the first output and an output impedance of the third output.

(8) A transmission device comprising a transmitter including a first output, a second output, and a third output, the transmitter configured to transmit a symbol signal corresponding to a combination of signals of the first output, the second output, and the third output, wherein a voltage amplitude of the signal of the second output is larger than a voltage amplitude of the signal of the first output.

(9) The transmission device according to (8), wherein the first output, the second output, and the third output are disposed in this order, and the voltage amplitude of the signal of the second output is larger than a voltage amplitude of the signal of the third output.

(10) The transmission device according to (8) or (9), wherein the transmitter is configured to vary the voltage amplitude of the signal of the second output.

(11) The transmission device according to (10), further including a receiver configured to receive a reception result from a reception device that receives the symbol signal, wherein the transmitter is configured to transmit the symbol signal having a predetermined sequence, and adjust the voltage amplitude of the signal of the second output, based on the reception result.

(12) A reception device including a receiver including a first input, a second input, and a third input, the receiver configured to receive a symbol signal corresponding to a combination of signals of the first input, the second input, and the third input, wherein an input impedance of the second input is higher than an input impedance of the first input.

(13) The reception device according to (12), wherein the first input, the second input, and the third input are disposed in this order, and the input impedance of the second input is higher than an input impedance of the third input.

(14) The reception device according to (12) or (13), wherein the receiver is configured to vary the input impedance of the second input.

(15) The reception device according to (14), wherein the receiver is configured to receive the symbol signal having a predetermined sequence, and adjust the input impedance of the second input, based on the reception result.

(16) The reception device according to (14), further including a transmitter configured to transmit output voltage indicating information to a transmission device that transmits the symbol signal, the output voltage indicating information indicating an output voltage of the transmission device, wherein the receiver is configured to adjust the input impedance of the second input, based on voltages of the first input, the second input, and the third input.

(17) A communication system provided with a transmission device and a reception device, the transmission device comprising a transmitter including a first output, a second output, and a third output, the transmitter configured to transmit a symbol signal corresponding to a combination of signals of the first output, the second output, and the third output, wherein a path impedance of the second output is lower than an output impedance of the first output.

(18) The communication system according to (17), further including an oscillator device configured to supply the transmission device with a reference clock signal, wherein the transmission device operates based on the reference clock signal.

(19) The communication system according to (17) or (18), wherein the transmitter is configured to vary the path impedance of the second output, and adjust the path impedance of the second output upon power-up of the communication system.

(20) The communication system according to (17) or (18), wherein the transmission device is an image sensor, and the reception device is a processor configured to process an image acquired by the image sensor.

(21) The communication system according to (20), wherein the transmitter is configured to vary the path impedance of the second output, and adjust the path impedance of the second output in a period other than a period in which image data including the image acquired by the images sensor is transmitted.

(22) The communication system according to (20) or (21), wherein the path impedance of the first output includes an input impedance of the first input, an output impedance of the first output, and an impedance of a first transmission line between the first input and the first output, and the path impedance of the second output includes an input impedance of the second input, an output impedance of the second output, and an impedance of a second transmission line between the second input and the second output.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 1B, 2, 3, 3B communication system
10, 10B, 50, 120, 120B transmission device
11 clock generator
12, 12B processor
14, 14B, 121B receiver
15, 15B, 55 controller
19 data generator
20, 20B, 60, 130, 130B transmitter
21 to 23 serializer
24 transmission symbol generator 25 signal generator
26 flip-flop
27, 27B, 67, 137B output section
28, 88 driver controller
28A to 28C, 88A to 88C impedance adjuster
29A to 29C driver section
30, 30B, 140, 140B reception device
32, 32B processor
33, 33B, 142B transmitter
39 data comparator
40, 40B, 150, 150B receiver
41A to 41C resistor
42A to 42C amplifier
43 clock generator
44, 45 flip-flop
46 signal generator
56 regulator
69 setting section
91, 94 transistor
92, 93 resistor
100 transmission path
101, 103 conductive layer
102 dielectric layer
110A to 110C line
141, 141B controller
151A to 151C ... variable resistor
281A to 287A, 281B to 287B, 281C to 287C, 881A to 887A, 881B to 887B, 881C to 887C AND circuit section
289A, 289B, 289C, 889A, 889B, 889C impedance controller
291A to 297A, 291B to 297B, 291C to 297C driver
2811A to 2814A, 2811B to 2814B, 2811C to 2814C AND circuit
CTL control signal
Czac, Czb, Czac1, Czb1, Czac2, Czb2, Czacup, Czacdn, Czbup, Czbdn, Cvac, Cvb, Cvb1, Cvb2 code
D1 to D3, Tx1 to Tx3 symbol signal
DAB, DBC, DCA difference
INF comparison result information
PU11A, PU12A, PD11A, PD12A, PU21A, PU22A, PD21A, PD22A, ..., PU71A, PU72A, PD71A, PD72A, PU11B, PU12B, PD11B, PD12B, PU21B, PU22B, PD21B, PD22B, PU71B, PU72B, PD71B, PD72B, PU11C, PU12C, PD11C, PD12C, PU21C, PU22C, PD21C, PD22C, ..., PU71C, PU72C, PD71C, PD72C control signal
RxCK, TxCK clock signal
RxF, RxR, RxP, TxF0 to TxF6, TxR0 to TxR6, TxP0 to TxP6 transition signal
SAB, SBC, SCA signal
Sctl, Sctl1, Sctl2, SEL1 to SEL7, SELU1 to SELU7, SELD1 to SELD7 control signal
Smode control signal
SIGA to SIGC signal
TinA, TinB, TinC input terminal
ToutA, ToutB, ToutC output terminal
UP1A, UP2A, DN1A, DN2A, UP1B, UP2B, DN1B, DN2B, UP1C, UP2C, DN1C, DN2C control signal
VH high-level voltage
VM medium-level voltage
VL low-level voltage
Vreg1, Vreg2 voltage
Vswa, Vswb, Vswc amplitude
Zia, Zib, Zic input impedance
Zoa, Zob, Zoc output impedance

The invention claimed is:

1. A transmission device comprising:
a transmitter including a first output, a second output, and a third output, the transmitter configured to transmit a symbol signal corresponding to a combination of signals of the first output, the second output, and the third output; and
a receiver configured to receive a control signal from a reception device, wherein the control signal is based on a reception result of the symbol signal,
wherein an output impedance of the second output is lower than an output impedance of the first output, and
wherein the transmitter is configured to transmit the symbol signal having a predetermined sequence, and adjust the output impedance of the second output, based on the reception result.

2. The transmission device according to claim 1, wherein the first output, the second output, and the third output are disposed in this order, and
the output impedance of the second output is lower than an output impedance of the third output.

3. The transmission device according to claim 1,
wherein the transmitter is configured to set voltages of the first output, the second output, and the third output, and adjust the output impedance of the second output, based on the reception result.

4. The transmission device according to claim 3, wherein the transmitter is configured to set the voltages of the first output and the second output to a first voltage and set the voltage of the third output to a second voltage, and adjust the output impedance of the second output when the voltage of the second output is set to the first voltage, based on the reception result.

5. The transmission device according to claim 1, wherein the transmitter is configured to vary the output impedance of the first output and an output impedance of the third output.

6. A transmission device comprising:
a transmitter including a first output, a second output, and a third output, the transmitter configured to transmit a symbol signal corresponding to a combination of signals of the first output, the second output, and the third output; and
a receiver configured to receive a control signal from a reception device, wherein the control signal is based on a reception result of the symbol signal,
wherein a voltage amplitude of the signal of the second output is larger than a voltage amplitude of the signal of the first output, and
wherein the transmitter is configured to transmit the symbol signal having a predetermined sequence, and adjust the voltage amplitude of the signal of the second output, based on the reception result.

7. The transmission device according to claim 6, wherein the first output, the second output, and the third output are disposed in this order, and
the voltage amplitude of the signal of the second output is larger than a voltage amplitude of the signal of the third output.

8. A reception device comprising:
a receiver including a first input, a second input, and a third input, the receiver configured to receive a symbol signal corresponding to a combination of signals of the first input, the second input, and the third input,
wherein an input impedance of the second input is higher than an input impedance of the first input, and
wherein the receiver is configured to receive the symbol signal having a predetermined sequence, and adjust the input impedance of the second input, based on the reception result.

9. The reception device according to claim 8, wherein the first input, the second input, and the third input are disposed in this order, and the input impedance of the second input is higher than an input impedance of the third input.

10. The reception device according to claim 8, further comprising a transmitter configured to transmit an output voltage indicating information to a transmission device that transmits the symbol signal, the output voltage indicating information indicating an output voltage of the transmission device,
    wherein the receiver is configured to adjust the input impedance of the second input, based on voltages of the first input, the second input, and the third input.

11. A communication system provided with a transmission device and a reception device, the transmission device comprising:
    a transmitter including a first output, a second output, and a third output, the transmitter configured to transmit a symbol signal corresponding to a combination of signals of the first output, the second output, and the third output; and
    a receiver configured to receive a control signal from the reception device, wherein the control signal is based on a reception result of the symbol signal, wherein
    a path impedance of the second output is lower than a path impedance of the first output, and
    the transmitter is configured to transmit the symbol signal having a predetermined sequence, and adjust the path impedance of the second output, based on the reception result.

12. The communication system according to claim 11, further comprising an oscillator device configured to supply the transmission device with a reference clock signal,
    wherein the transmission device operates based on the reference clock signal.

13. The communication system according to claim 11, wherein the transmitter is configured to adjust the path impedance of the second output upon a power-up of the communication system.

14. The communication system according to claim 11, wherein
    the transmission device is an image sensor, and
    the reception device is a processor configured to process an image acquired by the image sensor.

15. The communication system according to claim 14, wherein the transmitter is configured to adjust the path impedance of the second output in a period other than a period in which image data including the image acquired by the images sensor is transmitted.

16. The communication system according to claim 14, wherein
    the path impedance of the first output includes an input impedance of the first input, an output impedance of the first output, and an impedance of a first transmission line between the first input and the first output, and
    the path impedance of the second output includes an input impedance of the second input, an output impedance of the second output, and an impedance of a second transmission line between the second input and the second output.

* * * * *